United States Patent
Crodian et al.

(10) Patent No.: US 7,332,877 B2
(45) Date of Patent: Feb. 19, 2008

(54) LIGHT CONTROLLER

(75) Inventors: James Ray Crodian, Tampa, FL (US); Dale Johnston, Plant City, FL (US); Dan Alexander Ross, Lutz, FL (US)

(73) Assignee: Glowleds, Inc., Lutz, FL (US)

( * ) Notice: Subject to any disclaimer, the term of this patent is extended or adjusted under 35 U.S.C. 154(b) by 28 days.

(21) Appl. No.: 10/994,353

(22) Filed: Nov. 23, 2004

(65) Prior Publication Data

US 2005/0111231 A1    May 26, 2005

Related U.S. Application Data

(60) Provisional application No. 60/524,390, filed on Nov. 24, 2003.

(51) Int. Cl.
*G05F 1/00* (2006.01)

(52) U.S. Cl. .............. 315/297; 315/292; 315/360; 315/318; 315/82; 340/468; 340/472

(58) Field of Classification Search ........ 315/77, 315/82, 169.3, 291, 292, 312, 314, 318, 297, 315/307; 345/519, 520, 534, 589, 590, 601, 345/610, 691; 340/468, 472, 474, 475, 479; 362/227, 800, 545; 341/138, 140; 372/21, 372/26, 29.014, 29.015
See application file for complete search history.

(56) References Cited

U.S. PATENT DOCUMENTS

| | | | |
|---|---|---|---|
| 4,340,889 A | * 7/1982 | Knight et al. | 345/691 |
| 5,381,074 A | * 1/1995 | Rudzewicz et al. | 315/77 |
| 5,644,291 A | * 7/1997 | Jozwik | 340/472 |
| 6,016,038 A | * 1/2000 | Mueller et al. | 315/291 |
| 6,325,690 B1 | * 12/2001 | Nelson | 446/25 |
| 6,392,358 B1 | * 5/2002 | Runau et al. | 315/185 R |
| 6,525,683 B1 | * 2/2003 | Gu | 341/140 |
| 6,611,610 B1 | * 8/2003 | Stam et al. | 382/104 |
| 6,841,947 B2 | * 1/2005 | Berg-johansen | 315/169.3 |
| 6,963,175 B2 | * 11/2005 | Archenhold et al. | 315/291 |
| 6,987,787 B1 | * 1/2006 | Mick | 372/29.021 |
| 2005/0134188 A1 | * 6/2005 | Lindqvist | 315/149 |

OTHER PUBLICATIONS

Dallas Semiconductor Application Note 3667 "Using Lookup Tables to Perform Gamma Correction on LEDs", Oct. 10, 2005.

* cited by examiner

*Primary Examiner*—Haissa Philogene
(74) *Attorney, Agent, or Firm*—Miles & Stockbridge PC; Stephen W. Aycock, II

(57) ABSTRACT

A light controller capable of varying the brightness of a light emitting diode in a linear manner. The light controller may control a number of lights in a predetermined pattern or in a pattern designed by the user. A remote control may be used to control and interact with the light controller. The light controller may have inputs for audio signals, tachometer signals, or other external signals. The light controller may be coupled to other light controllers to enable the control of additional lights in a synchronized manner. The light controller may be particularly well suited to controlling light emitting diodes and controlling lights in a vehicle accent lighting application, although many other uses may be apparent.

26 Claims, 24 Drawing Sheets

LIGHT CONTROLLER

This application claims the benefit of U.S. Provisional Application No. 60/524,390, filed Nov. 24, 2003, which is incorporated herein by reference.

The present invention relates generally to light control, and more particularly to a programmable light controller capable of controlling the brightness of a light.

It may be desirable to control lights according to a pattern or in response to a signal or stimulus. A light controller, according to the present invention, capable of controlling lights according to a pattern or in response to a signal or stimulus may have a variety of applications. Controlling lights in a pattern may be particularly useful or desirable in accent or decorative lighting applications.

The brightness, color, or other characteristic of a light may be controlled to produce a desired effect.

Existing light controllers, particularly those controlling light-emitting diodes, may be limited in the ability to control the brightness or other characteristics of the light-emitting diode. For example, existing light controllers for automotive applications may not allow a user to create unique colored lighting effects within headlights, taillights, or other locations on a vehicle. Conventional vehicle light controllers may also contain fixed patterns of light display and may not be subject to reprogramming.

Conventional vehicle accent lights, such as strobe lights or neon lights, may not be easily installed at various locations on a vehicle due to the size of the light. Exemplary embodiments of the lighting elements of the present invention utilize a light-emitting diode as a light source. The relatively compact size of the light-emitting diode may allow for placement of the light in a wider range of locations including headlights, taillights, turn signals, brake lights, engine compartment, wheels, vehicle exterior, vehicle interior, vehicle underside, instruments, dashboard, air vents, speaker grills, and/or the like.

Conventional vehicle accent lights, such as strobe lights or neon lights, may not be easily controlled. For example, strobe lights may not be colored and may not be receptive to pattern or brightness control. Neon lights, while available in a variety of colors, may be limited in the ability to respond to brightness control.

Conventional brightness control methods for light emitting diodes may vary the duty cycle of the light emitting diode in a linear manner in order to vary the brightness of the light. However, this method of linearly varying the duty cycle may result in a nonlinear change in brightness. In an exemplary embodiment of the light controller of the present invention a method of controlling the brightness of a light-emitting diode that creates a perception of linear change in brightness is provided. The method of the present invention is to vary the duty cycle of the light-emitting diode in a nonlinear manner in order to achieve a linear change in perceived brightness. The resulting change in brightness may produce a more aesthetically pleasing and natural effect to the human eye.

In an exemplary embodiment of the present invention the light modules utilizing light-emitting diodes may benefit from lower cost, longer life, wider variety of colors, improved control response, and lower power consumption relative to other light sources.

In an exemplary embodiment of the present invention, a light controller provides centralized control of the accent lighting for a vehicle. The light controller provides a user with the ability to customize lighting patterns and the order in which the patterns are displayed. In addition, the light controller can generate a light pattern that responds to an input signal, such as, for example, an audio signal, a tachometer signal, or other signal source. A remote control unit permits the user to operate the light controller, select light patterns to be displayed, and interact with the light controller. The light controller can be tailored to a contemplated application. In an exemplary embodiment, the light controller may have the ability to individually control multiple channels of lights with each channel having multiple individually controllable lights connected.

A computer can be coupled to the light controller and light control sequences can be downloaded from the computer to the light controller and uploaded from the light controller to the computer. Software designed for creating and editing light control sequences, according to the present invention, may be used to generate light control sequences for downloading to the light controller.

The light controller of the present invention may overcome the limitations of conventional light controllers by providing a light control system with lights that may be easy to install, multiple individually controllable light channels, customizable lighting patterns, a computer interface, and a remote control.

BRIEF DESCRIPTION OF THE DRAWINGS

The present invention will be described with reference to the accompanying drawings, wherein.

DETAILED DESCRIPTION

Figure 1:
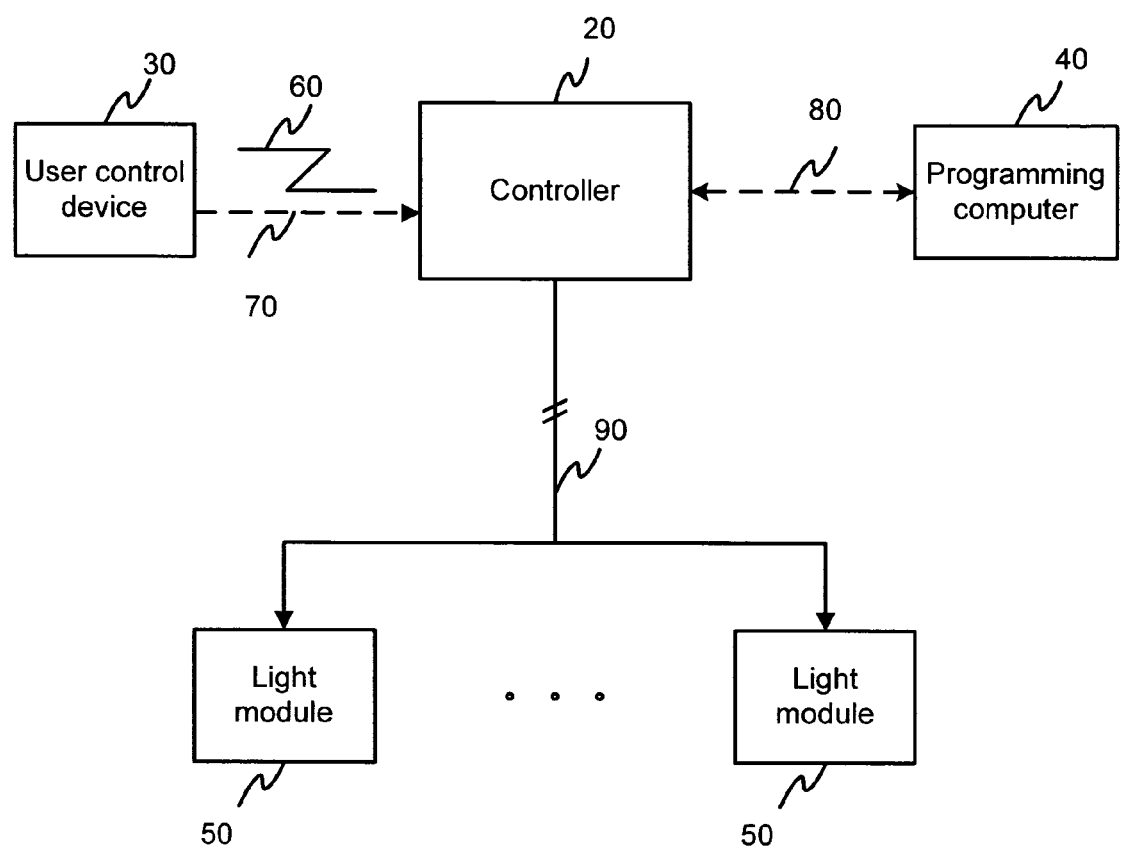
FIG. 1 is a block diagram of an exemplary embodiment of a light control system in accordance with the present invention.

A light controller in accordance with the present invention is described in the exemplary embodiments below in terms of a vehicle light control system. However, it should be appreciated that the light controller of the present invention may be configured for various applications, for example, lighting on a vehicle, lighting on an object, lighting on a building or other structure, lighting for a dance floor, lighting in a nightclub, lighting for a disc jockey, lighting for a computer or other electronic equipment, a portable lighting system, lighting for children's toys, lighting for gardens or outdoor pathways, mood lighting and/or the like. For purposes of illustration, lights may be described in terms of light-emitting diodes. However, it should be appreciated that while the present invention may be particularly well suited for the application of controlling light-emitting diodes, it may be used to control other types of lights.

In an exemplary embodiment, a light controller in accordance with the present invention has a timing module generating clock cycles and a brightness control module controlling a brightness of a light for every one of a predetermined number of clock cycles, wherein the brightness of the light is determined by a duty cycle, and wherein the duty cycle is based on a desired brightness associated with the predetermined number of clock cycles. The brightness control module may be implemented in a microcontroller.

The microcontroller may have a memory coupled to it or contained within it. The memory may provide storage for computer instructions to perform the light control operations, including a look-up-table, or mathematical equation, to provide a duty cycle corresponding to a desired level of brightness of the light.

The light controller may also have an auxiliary input module for receiving input data or signals; a user control input module for receiving input from a user control device, such as a remote control; a signal-receiving module for receiving signals; a bi-directional data transfer module for transferring data with another device, such as a computer or other light control unit.

In an exemplary embodiment, the light controller operates by loading light control pattern data from the memory to the microcontroller. The microcontroller then controls the lights corresponding to the parameters set forth in the light control pattern data. The pattern data includes parameters to direct the microcontroller to activate a light module output port corresponding to the light that is being controlled. There may be multiple lights being controlled simultaneously. The lights may be individually controlled, or controlled in groups arranged serially, in parallel, or in a combination of serial and parallel connections.

The light controller may have a pre-stored set of patterns in a read only memory. The light controller may also have random access, or nonvolatile, memory space for storing user created pattern data. The user created pattern data may be transferred to the light controller through the bi-directional data transfer module, or may be transferred using another wired or wireless connection.

Examples of light modules include a light-emitting diode or a group of light-emitting diodes. The light-emitting diodes may be arranged in a line, a geometric pattern, and/or any other functional or decorative pattern. In instances of multiple light groups, the lights may be of the same or different color. Further, the lights in groups may be connected individually to the light controller or in serial, parallel, or in a combination of serial and parallel connections. If the lights are in groups, are multi-colored, and are connected individually, the light controller may be used to select a desired color of light to be turned on based on the light control pattern data.

In an exemplary embodiment for use on a vehicle, the light controller may be used to control a headlight, a tail light, a dome light, a hood light, a trunk light, an instrument light, a dashboard light, an instrument panel light, a control knob light, a door light, an exterior accent light, an interior accent light, a turn signal, a cabin light, a license plate light, a reverse light, a hazard light, an air vent light, a warning light, an undercarriage light, a video system light, a game system light, an alarm system light and/or an audio system light.

In an exemplary embodiment, the software and/or hardware of the microcontroller is configured to cause the microcontroller to receive a clock signal; receive a desired brightness of the light associated with a predetermined number of clock signal cycles based on the light control pattern data; determine a duty cycle based on the desired brightness; determine a modulation waveform based on the duty cycle; and transmit the modulation waveform to the light for the predetermined number of clock signal cycles.

The determination of the duty cycle based on the desired brightness is based on a nonlinear relationship between duty cycle and perceived brightness of light-emitting diodes. The duty cycle may be determined from the desired brightness in accordance with the methods of the invention by means of a look up table, an equation within the software instructions, and/or any other mechanisms that allows for the nonlinear relationship of desired brightness to duty cycle to be determined. A result of the nonlinear desired brightness to duty cycle relationship of the present invention, a change in brightness of the light-emitting diode may be perceived by the human eye to be linear. In other words the fading on or off of the light-emitting diode occurs in a smooth and even appearing fashion.

In addition to controlling lights based on pattern data, the light controller may control lights based on a signal. The signal may be received from an external source, or may be generated within the light controller. For example, the light controller may control lights based on an audio input signal, a tachometer input signal, and/or any other signal in accordance with a contemplated use on the invention.

The light pattern data is built up from component data. A waveform is the basic unit of light control data and includes five sections: an initial delay section, a rise section, a hold section, a decay section, and an ending delay section. The waveforms may be linked or coupled together to form a sequence. The sequence is typically associated with one light, but may be associated with more than one light. Sequences may be joined or coupled to form a pattern. The pattern may control the lights for an entire light control system, and specify the brightness and timing parameters of each of the lights in a system.

FIG. 1 is a block diagram of an exemplary embodiment of a light control system in accordance with the present invention. In particular, a light control system 10 comprises a controller 20, one or more light modules 50, a user control device 30, and an optional programming computer 40. The light modules 50 are coupled to the controller 20 via links 90. The user control device 30 may be coupled to the controller 20 via a wired link 70 or a wireless link 60. The programming computer 40 may be coupled to the controller 20 via a link 80.

In operation, at start-up, the controller 20 may execute a pre-stored pattern, a user defined pattern, or may wait to receive a signal from the user control device 30 to begin a light control pattern. The light control pattern may be a pre-stored pattern or may be a user-defined pattern received from the programming computer 40. The controller comprises a processor (not shown) coupled to a timing module (not shown) to generate signals to control the brightness of the light modules 50. The controller 20 sends a signal via links 90 to each of the light modules 50. The signal may be a power signal that is pulse width modulated to control the brightness of the light output from the light modules 50. The user control device 30 may be used to select among various patterns stored in a storage within the controller. The control device 30 may also be used to turn the controller 20 on or off.

Figure 2:
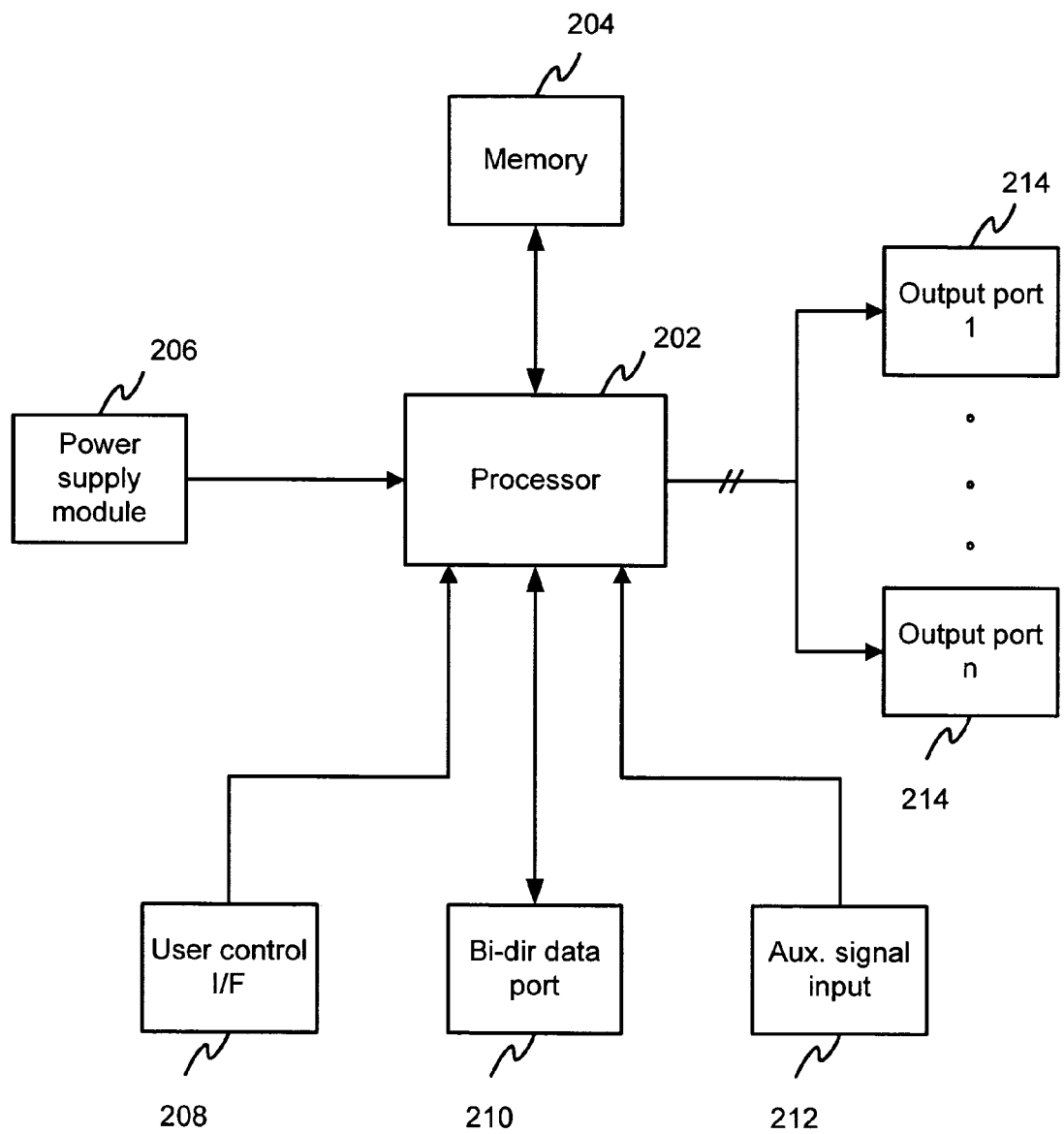
FIG. 2 is a block diagram of an exemplary embodiment of a light controller in accordance with the present invention.

FIG. 2 is a block diagram of an exemplary embodiment of a light controller in accordance with the present invention. In particular, a controller 20 comprises a processor 202 coupled to a memory 204, power supply module 206, a user control interface 208, a bi-directional data port 210, an auxiliary signal input module 212, and one or more output ports 214.

In operation, power is supplied to the processor 202 via the power supply module 206. The power supplied by the power supply module 206 may have a voltage similar to the vehicle voltage supply, or may have a voltage, differing from the vehicle voltage, regulated by circuitry (not shown) within the power supply module 206. The memory 204, which may be at least partially nonvolatile, stores a software program configured to cause the processor 202 to perform the operations of a light controller, and light control patterns. Upon power up, the processor 202 retrieves the operational software from the memory 204. The processor 204 then executes the instructions contained in the software program. The processor 204, in response to the software, monitors the user control interface 208 for incoming signals from the user control device (not shown), monitors the bi-directional data port for incoming signals, and, if in a mode requiring to processor 202 to do so, monitors the auxiliary input signal port. For example, a user of the light controller may select a light control pattern to be displayed using the user control device. The processor 202, detects the incoming selection command on the user control interface 208, retrieves the corresponding pattern data from the memory 204, and begins to execute the pattern causing control signals to be transmitted on the output ports 214 corresponding to the light being controlled.

The auxiliary signal input module may be used to receive a signal from outside the light controller 20. For example, an external signal may be an audio source. The light controller 20 may receive an audio signal via the auxiliary signal input port and process the audio signal in order to display lights corresponding to an aspect of the audio signal. For example, the light controller may cause the light modules to flash to the beat of the music. Further, the light controller may generate a light pattern that is mathematically relative to a desired characteristic of the audio signal. In a low cost embodiment of the light controller 20, a portion of circuitry may be used as a low pass filter to allow the processor to acquire the "beat" of the bass tones of the audio signal. In a more sophisticated embodiment, the processor may be a digital signal processor (DSP) and the audio signal may be processed directly by the DSP to determine the signal characteristics for controlling the lights.

Another use for the auxiliary input signal port may be for receiving a signal from the vehicle, such as a tachometer signal. In this embodiment, the light controller 20 may control the lights based on a characteristic of the tachometer signal, such as, for example, frequency or voltage level. By coupling the light controller to the tachometer signal, the lights may be controlled in response to the engine revolutions per minute (RPM), for example, the lights could become brighter at higher RPM values.

A signal input port (not shown) may be used to disable the light controller when the vehicle ignition is on. This feature may be useful in areas where light operation is undesirable while the vehicle is in operation.

In yet another exemplary embodiment, the light controller is portable and the auxiliary signal input port is coupled to a microphone for receiving external audio. In this embodiment, the light controller may control the light display in accordance to a characteristic of the audio sources surrounding the light controller.

Figure 3:
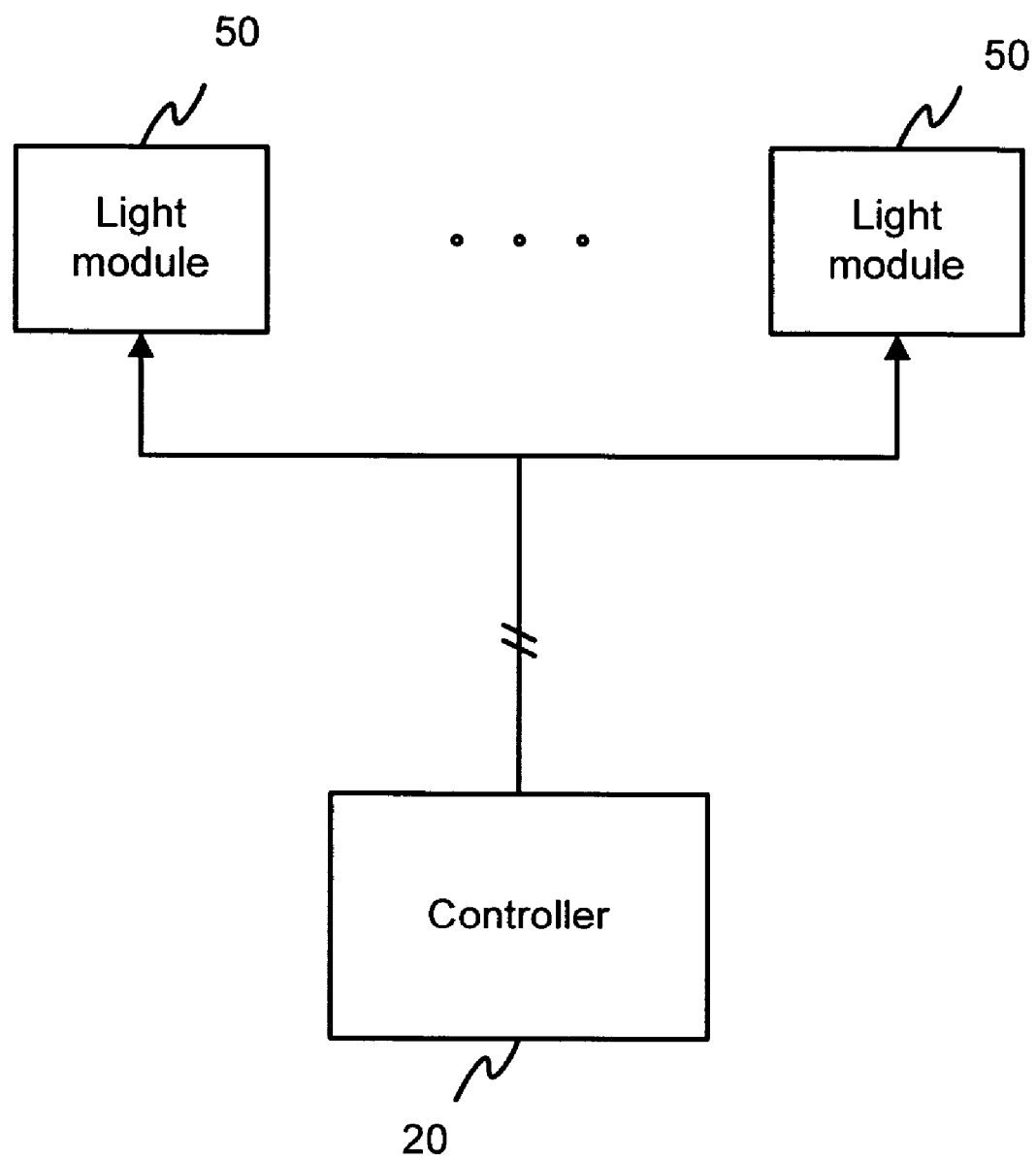
FIG. 3 is a block diagram of an exemplary embodiment of a light controller in accordance with the present invention.

FIG. 3 is a block diagram of an exemplary embodiment of a light controller in accordance with the present invention. In particular, a controller 20 is shown connected to light modules 50.

In operation, the controller 20 may be connected to one or more light modules 50. The controller may send each light module 50 a unique control signal or may send each light module 50 the same control signal. Further, the controller 20 may send a mix of both unique and similar control signals to different light modules 50, depending on a contemplated use of the invention.

Figure 4:
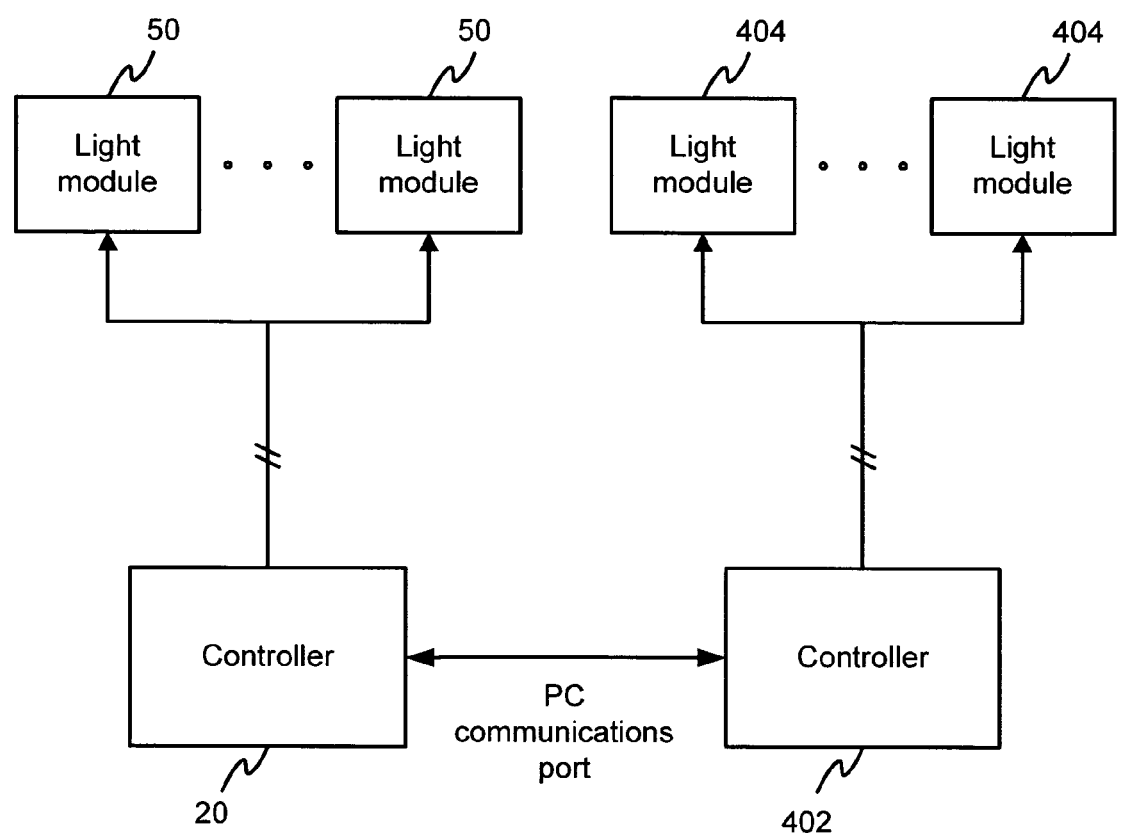
FIG. 4 is a block diagram of an exemplary embodiment of a light controller in accordance with the present invention.

FIG. 4 is a block diagram of an exemplary embodiment of a light controller in accordance with the present invention. In particular, a first controller 20 is shown connected to a second controller 402. The first controller is connected to a plurality of light modules 50. The second controller is connected to a plurality of light modules 404.

In operation, the first controller 20 may operate as a "master" controller and the second controller 402 may operate as a "slave" controller. In this configuration, the first controller 20 may supply a timing signal, a data signal, or a combination of timing and data signals to the second controller 402. These signals may cause the second controller 402 to display a light pattern in synchronization with the light pattern being displayed by the first controller 20. Coupling two controllers may provide for displaying similar or different patterns in or out of synchronization, or for displaying a similar or different pattern in another desired timing relationship. By coupling the first controller 20 and the second controller 402, and causing them to operate in unison, a greater number of light modules 50 and 404 may be controlled than with a single controller alone.

Figure 5:
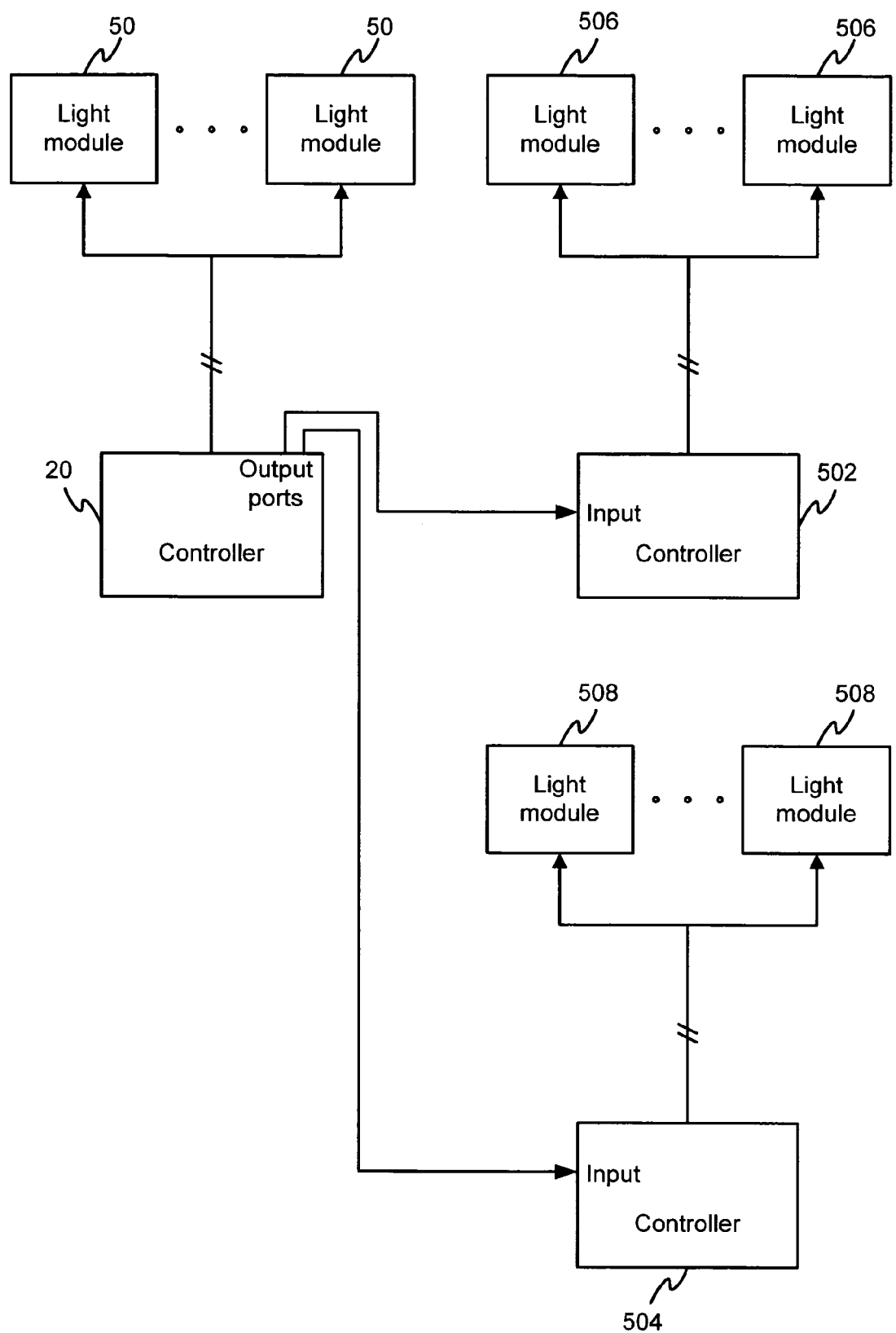
FIG. 5 is a block diagram of an exemplary embodiment of a light controller in accordance with the present invention.

FIG. 5 is a block diagram of an exemplary embodiment of a light controller in accordance with the present invention. In particular, a first controller 20 is shown connected to a second controller 502 and a third controller 504 by individual links. The first controller 20 is connected to a plurality of light modules 50. The second controller 502 is shown connected to a plurality of light modules 506. The third controller 504 is shown connected to a plurality of light modules 508. Specifically, FIG. 5 illustrates an embodiment where the first controller 20 uses two output ports to transmit a signal to the second and third controllers (502 and 504).

In operation, the first controller 20 may send timing, data, or other signal via an output port to an input of the second controller 502 and an input of the third controller 504. The coupling of the three controllers (20, 502, and 504) may provide for displaying similar or different patterns in or out of synchronization, or for displaying a similar or different pattern in another desired timing relationship. By coupling the first controller 20 and the second controller 502 and third controller 504, and causing them to operate in unison, a greater number of light modules 50, 506, and 508 may be controlled than with a single controller alone. While the exemplary embodiment of FIG. 5 shows three controllers coupled, it should be appreciated that any number of controllers may be coupled together in accordance with a contemplated use of the invention.

Figure 6:
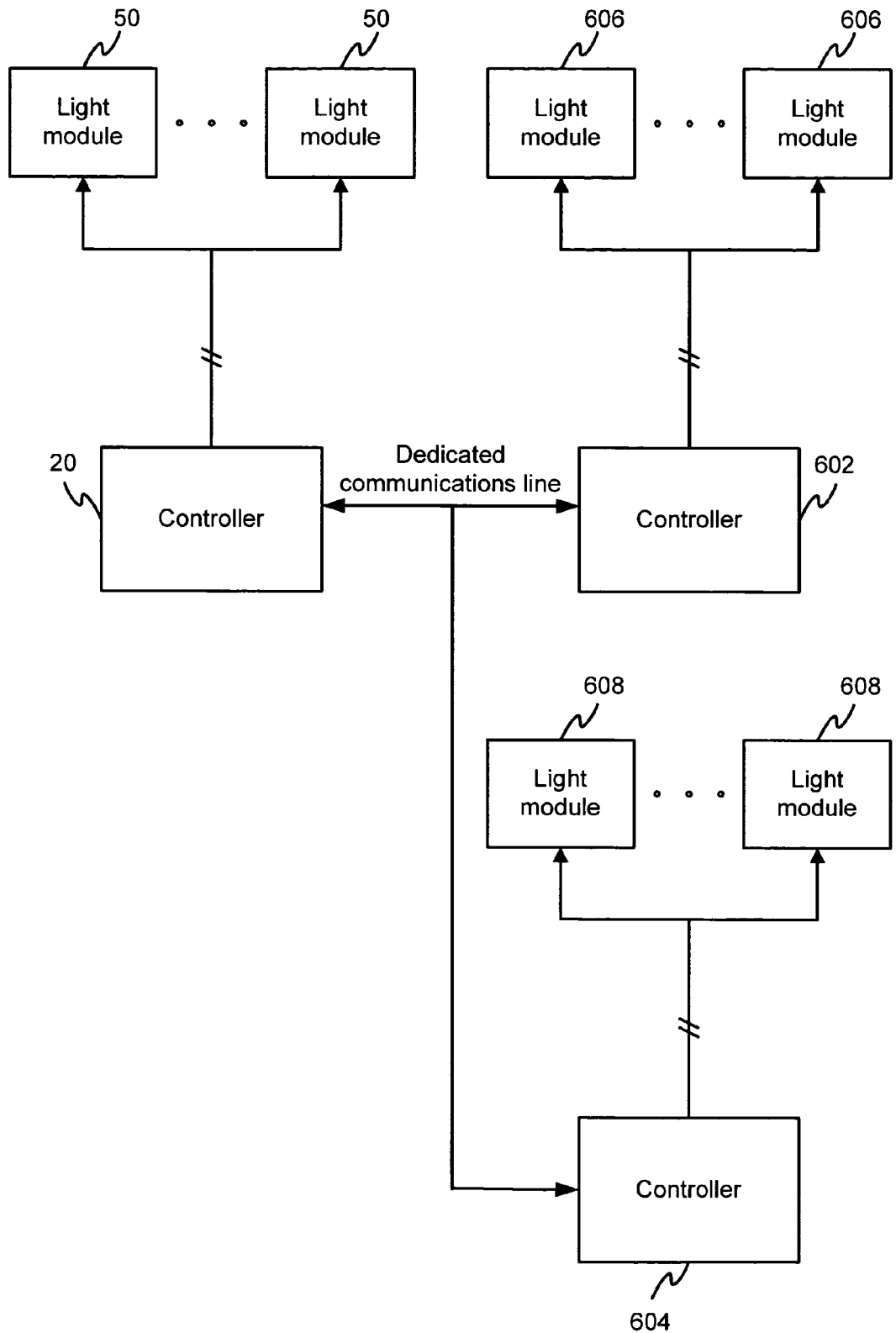
FIG. 6 is a block diagram of an exemplary embodiment of a light controller in accordance with the present invention.

FIG. 6 is a block diagram of an exemplary embodiment of a light controller in accordance with the present invention. In particular, a first controller 20 is shown connected to a second controller 602 and a third controller 604 by a common link. The first controller 20 is connected to a plurality of light modules 50. The second controller 602 is shown connected to a plurality of light modules 50. The third controller 604 is shown connected to a plurality of light modules 50. Specifically, FIG. 6 illustrates an embodiment where the first controller 20, the second controller 602, and the third controller 604 are coupled via a dedicated communications line.

In operation, the first controller 20 may send timing, data, or other signal via the dedicated communications line to the second controller 602 and the third controller 604. The coupling of the three controllers (20, 602, and 604) may provide for displaying similar or different patterns in or out of synchronization, or for displaying a similar or different pattern in another desired timing relationship. By coupling the first controller 20 and the second controller 602 and third controller 604, and causing them to operate in unison, a greater number of light modules 50, 606, and 608 may be controlled than with a single controller alone. Using a dedicated communications line, or bus, as shown in FIG. 6, instead of output ports and input ports to provide communications between controllers may allow for additional light modules to be controlled. While the exemplary embodiment of FIG. 6 shows three controllers coupled, it should be appreciated that any number of controllers may be coupled together in accordance with a contemplated use of the invention.

Figure 7:
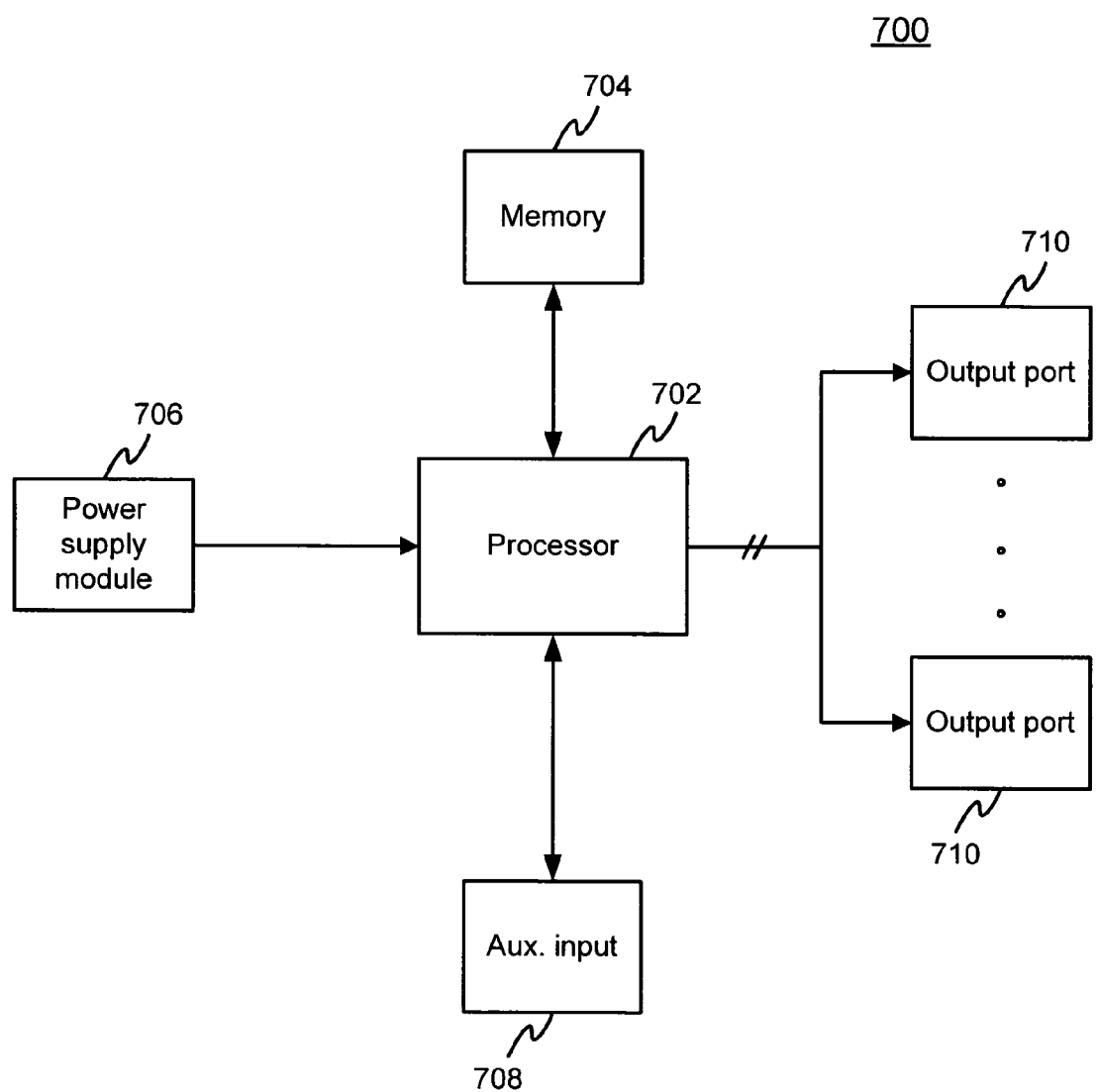
FIG. 7 is a block diagram of an exemplary embodiment of a light controller in accordance with the present invention.

FIG. 7 is a block diagram of an exemplary embodiment of a light controller in accordance with the present invention. In particular, a controller 700 comprises a processor 702 coupled to a memory 704, power supply module 706, auxiliary input module 708, and one or more output ports 710.

The controller 700 is a simplified embodiment as compared to the controller 20 of FIG. 2 and may be better suited to operate as a slave controller in a configuration where two or more controller are coupled with each other. By providing a simplified controller 700, a reduced system cost may be achieved by eliminating circuitry within the controller that may not be necessary in a slave controller. The controller 700 operates in a similar manner to the controller 20 as shown in FIG. 2 and described above. Certain circuitry modules have been eliminated in the controller 700 that may not be required in a slave controller.

Figure 8:
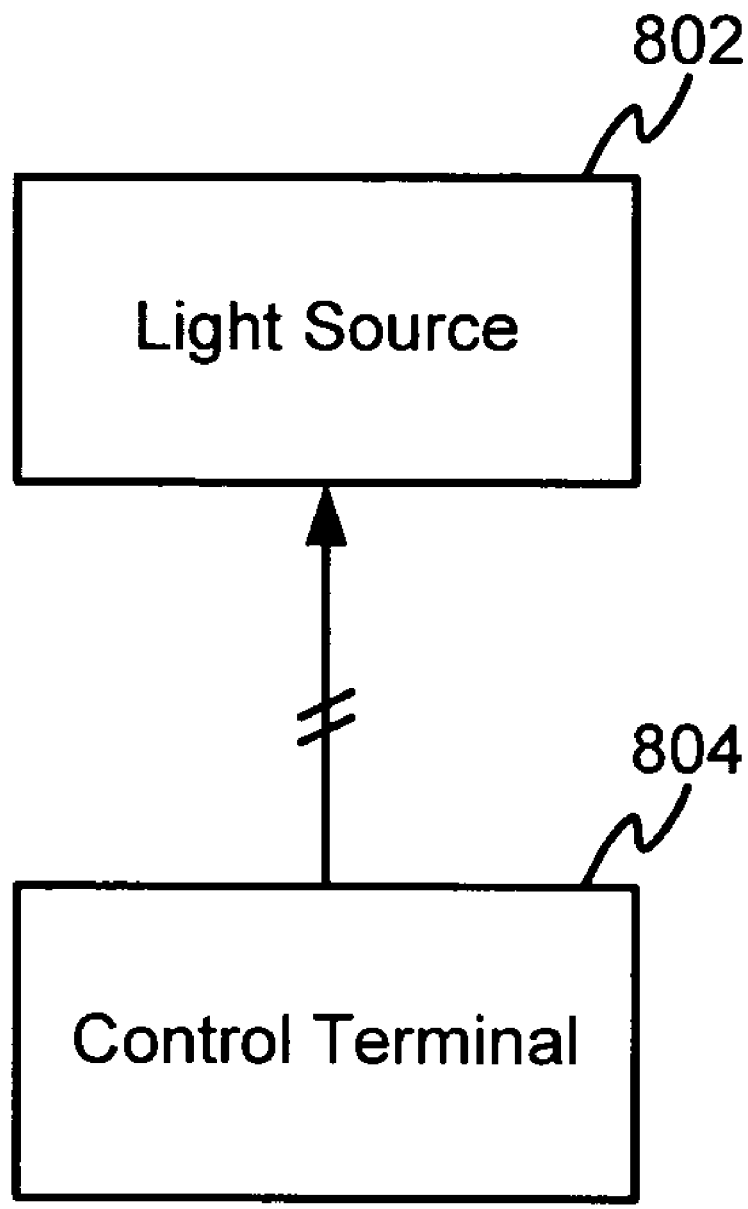
FIG. 8 is a block diagram of an exemplary embodiment of a light module in accordance with the present invention.

FIG. 8 is a block diagram of an exemplary embodiment of a light module in accordance with the present invention. In particular, a light source 802 is coupled to a control terminal 804.

In operation, a signal in received at the control terminal 804. The signal may be comprised of data, power, timing, and/or a combination of the above. The light source 802 is coupled to the control terminal 804 and receives the signal causing the light source to produce light in accordance with the signal received.

Figure 9:
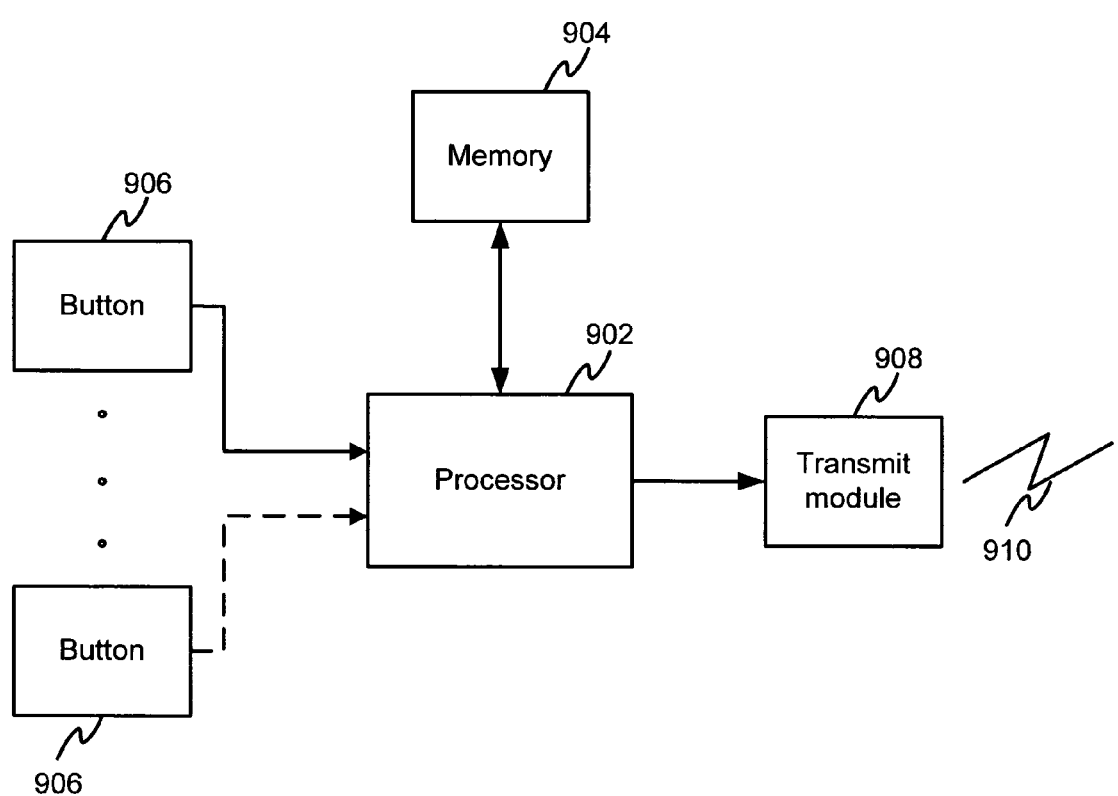
FIG. 9 is a block diagram of an exemplary embodiment of a remote control in accordance with the present invention.

FIG. 9 is a block diagram of an exemplary embodiment of a remote control in accordance with the present invention. In particular, a remote comprises a processor 902 coupled to a memory 904, a transmit module 908 and one or more buttons 906.

In operation, when one of the buttons 906 is pressed, the processor 902 detects the button pressed state and transmits a corresponding signal via the transmit module 908. The button functions may include on, off, change patterns, and/or the like.

Each remote control unit has a unique serial number appended to every transmission. In order for a light controller to recognize a particular remote control serial number, the light controller and the remote control must be synchronized. In an exemplary embodiment, the remote control and the light controller are synchronized by simultaneously pressing a button on the remote control and the light controller for a certain duration of time. During the duration of time the remote control is transmitting its serial number. The light controller receives the serial number after the duration of time and may store the serial number in nonvolatile memory. Then, whenever the light controller receives a transmission from a remote control, the light controller checks the received serial number against the serial number stored in nonvolatile memory and if the two serial numbers match, the light controller responds to the received command. If the two serial numbers do not match, the light controller does not respond to the received command.

In an alternative exemplary embodiment not shown, the remote control may be a wired remote control. In one embodiment of a wired remote control, the remote would provide buttons for controlling the light controller. In this embodiment, the wired remote control may not need a microcontroller and the memory with the serial number stored therein. In a second wired remote control embodiment, the remote control may contain a processor that communicates with the light controller, for example, when one of the buttons is pressed.

Figure 10:
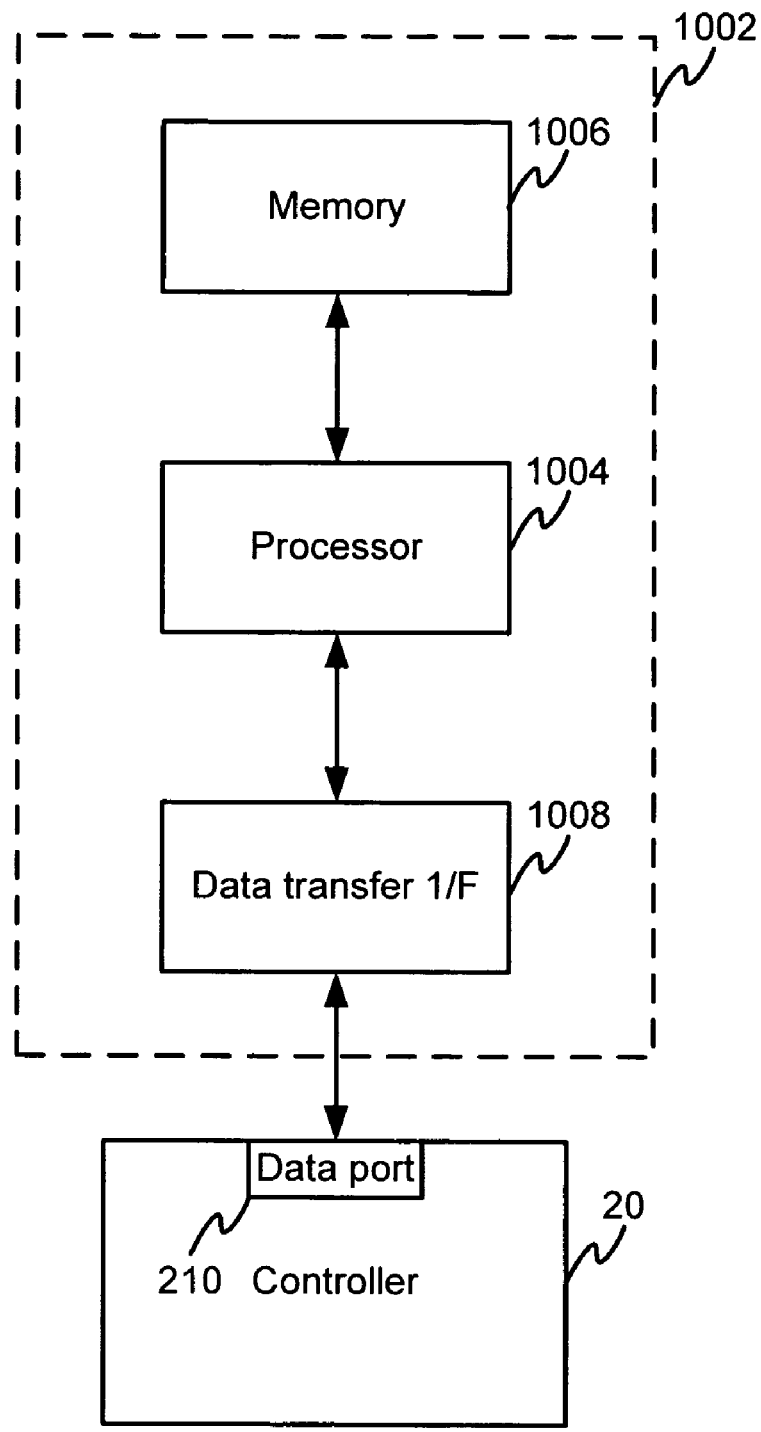
FIG. 10 is a block diagram of an exemplary embodiment of a computer programming a light controller in accordance with the present invention.

FIG. 10 is a block diagram of an exemplary embodiment of a computer programming a light controller in accordance with the present invention. In particular, a programming computer 1002 comprises a memory 1006, a processor 1004, and a data transfer interface 1008. A controller 20 comprises a bi-directional data port 210.

In operation, one or more software programs stored in the memory 1006 are configured to cause the processor 1004 within the computer 1002 to perform the operations which may be needed to create or edit light control waveforms, sequences, and patterns; and to program the light controller 20. Once a user has created or edited a light control pattern, the user may program, or transfer, the light control pattern data to the light controller 20 via the data transfer interface 1008 of the programming computer 1002. The data is received by the light controller 20 via the data port 210. The transmission from the programming computer 1002 to the light controller 20 may be made via a wired link or a wireless link, such as, for example, radio frequency or light. The programming computer 1002 may be any devices capable of providing the functions needed to create, edit, or download light control pattern data to the light controller 20, such as, for example, a personal computer, a cell phone or other wireless device, a portable computer, a laptop computer, a personal digital assistant, a handheld computer, and/or the like.

Figure 11:
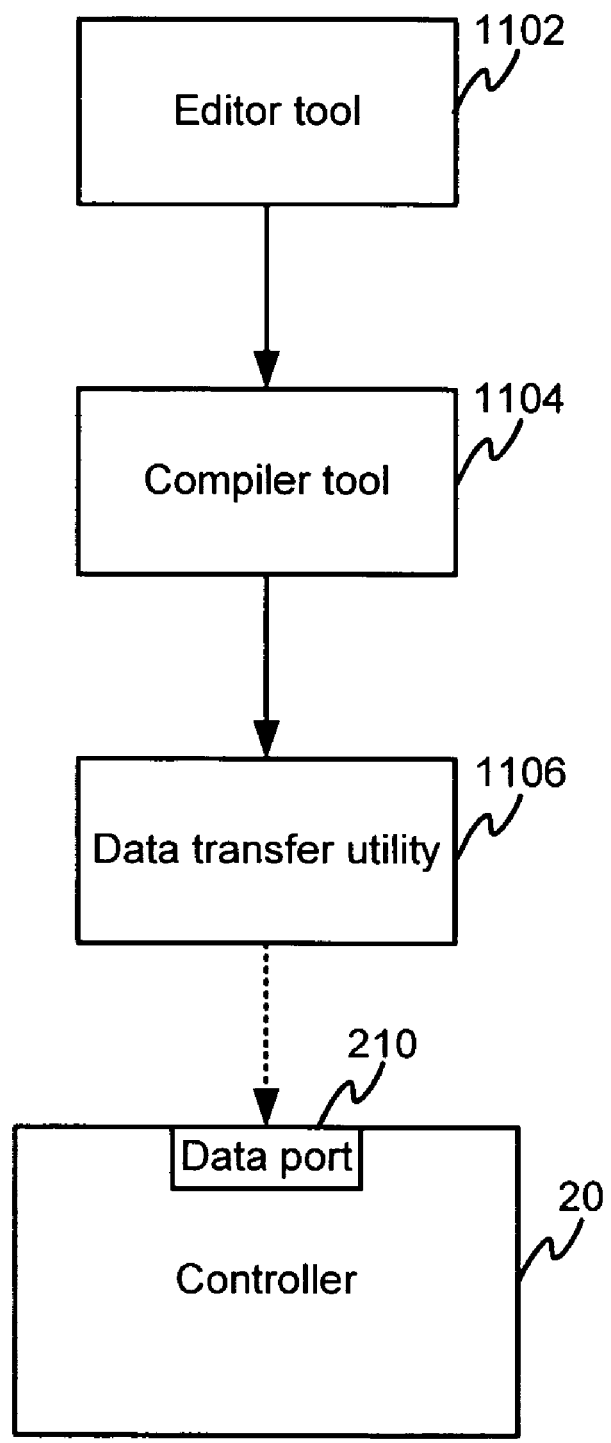
FIG. 11 is a block diagram of an exemplary embodiment of a computer software program for programming a light controller in accordance with the present invention.

FIG. 11 is a block diagram of an exemplary embodiment of a computer software program for programming a light controller in accordance with the present invention. In particular, software for programming a light controller in accordance with the present invention comprises an editor tool 1102, a compiler tool 1104, and a data transfer utility 1106. A controller 20 comprises a bi-directional data transfer port 210.

In operation, a user creates or edits a light control waveform, sequence, or pattern using the editor tool 1102. The waveform, sequence, or pattern is then received and compiled by the compiling tool 1104 into a data format suitable for transmitting to the light controller 20 and storing therein. The data transfer utility 1102 receives the compiled light pattern data and transfers it to the light controller 20 via the bi-directional data port 210. The software tools (1102, 1104, and 1106) may be separate programs or may be combined into one programs, or a combination of the above. Further, the software may be distributed onto different processors or co-located onto one processor.

Figure 12:
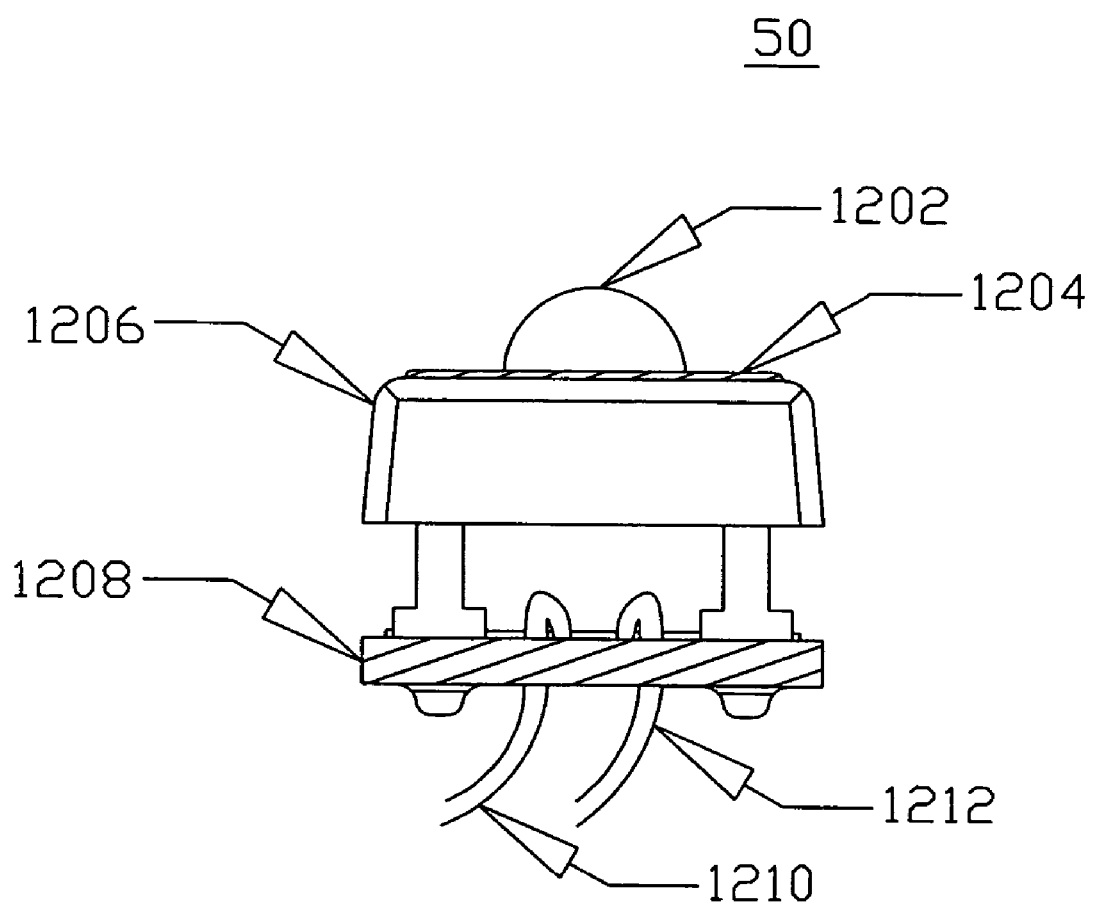
FIG. 12 is a cut away diagram of an exemplary embodiment of a light module in accordance with the present invention.

FIG. 12 is a cut away diagram of an exemplary embodiment of a light module in accordance with the present invention. In particular, a light module 50 comprises a visible light emitting portion 1202, an adhesive portion 1204, a body of a light emitter 1206, a printed circuit board 1208, a positive supply terminal 1210, and a negative supply terminal 1212.

In operation, a light controller supplies a positive supply voltage to the positive supply terminal 1210, while the negative supply terminal 1212 may be connected to a lower potential, for example, ground. Current flows through the light, which, in turn, causes light to be emitted from the visible light emitting portion 1202. In the embodiment of the light module 50 shown in FIG. 12, the light module 50 may be installed by drilling a hole in the plastic reflective body of a headlight, for example. Then, the light module 50 is aligned with the hole such that the visible light-emitting portion 1202 will be inserted into the hole when the light module 50 is pressed against the surface of the plastic reflective body. The light module 50 is then pressed against the plastic reflective body such that the adhesive portion 1204 makes contact and adheres to the plastic reflective body, while the visible light-emitting portion 1202 is inserted into the hole and protrudes from the opposite side of the plastic reflective body.

In yet another exemplary embodiment, the light module may have a rubber grommet affixed to a portion surrounding the light emitting portion. The light module may then be inserted into a pre-drilled hole and held in place using the press-fit force of the rubber grommet against sidewalls of the pre-drilled hole.

Further, the light module may be constructed with a resistor (not shown) to adapt a voltage and/or current requirement of a particular light to the light controller output.

Additional mounting methods may be utilized, such as, for example, fasteners (screws, bolts, rivets, nails, etc.), adhesives (tape, glue, epoxy, etc.), magnets, suction cup, hook-and-loop (e.g. Velcro™), press fit, and/or other mechanical attachments.

In an exemplary embodiment, the lighting control method of the light controller of the present invention is based on an abstract waveform generator. The abstract waveform generator processes pattern data to produce a light display. The pattern data is built up in a hierarchical manner. A waveform, comprising six sections, may be used to build a sequence. A sequence comprises one or more waveforms. Sequences may be used to control and individual light. One or more sequences are combined to form a pattern. A pattern may be used to control one or more of the lights connected to the light controller. In other words, a pattern contains the light control data, including the timing, brightness changes, and on/off commands for the set of lights being controlled.

A waveform may have parameters associated with each section, such as, for example, WaveSteady, WaveLimit, WaveRise, and/or the like. In an exemplary embodiment of a sequence, processing begins with a waveform index set to one. The waveform corresponding to the waveform index is retrieved. A timer is loaded with the amount of time the waveform is to be displayed. The waveform will then keep being displayed until the timer counts down to 0. Then, the waveform index is incremented and then next waveform is retrieved. The timer is loaded with the amount of time the second waveform is to be displayed. Once the timer counts down on the second waveform, the process of incrementing the waveform index and using the timer to determine how long to display the waveform continues until the last waveform entry is reached. The process is performed in parallel for each sequence (and output port) in the pattern. Each output operates in parallel with the others. In other words, two output ports may display one waveform repeatedly while another two output ports may display five different waveforms as their sequence.

This execution of a sequence of waveforms with timers is called a pattern. A pattern may be complex and formed of continuously repeating, distinct sequences. A user may switch between different patterns when they press a button on the remote.

Figure 13:
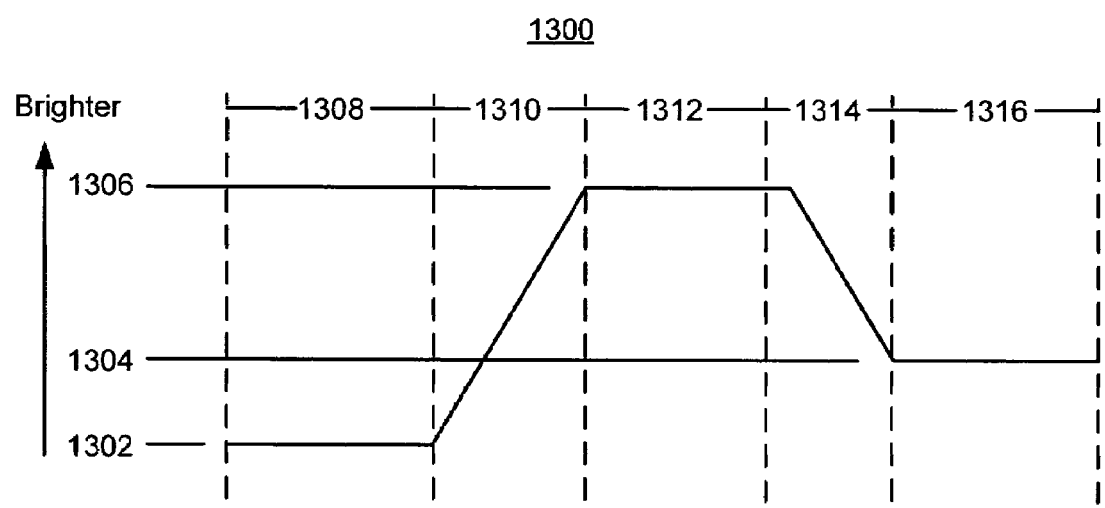
FIG. 13 is a diagram of an exemplary embodiment of a waveform for controlling a light in accordance with the present invention.

FIG. 13 is a diagram of an exemplary embodiment of a waveform for controlling a light in accordance with the present invention. In particular, a waveform 1300 comprises a low delay level 1302, a steady low level 1304, a steady high level 1306, a start delay section 1308, a rise section 1310, a hold section 1312, a decay section 1314, and an end delay section 1316.

In operation, a processor retrieves a waveform from memory and generates pulse-width modulated output based on the waveform. The low delay level 1302 corresponds to a desired brightness level of the light during the start delay section 1308. Then the brightness level of the light changes during the rise section 1310 to the steady high level 1306. The brightness remains at the steady high level 1306 for the duration of the hold section 1312. Then, the brightness decreases from the steady high level 1306 to the steady low level 1304 during the decay section 1314. Finally, the brightness remains at the steady low level 1304 for the duration of the end delay section 1316.

The sections may be altered if a different effect is desired. For example, the first time through the waveform all five sections may be processed. In subsequent passes though the same waveform, the start delay section 1308 may be skipped in order to produce a staggered effect, or to create a more uniform appearance when a waveform is being repeated.

Figure 14:
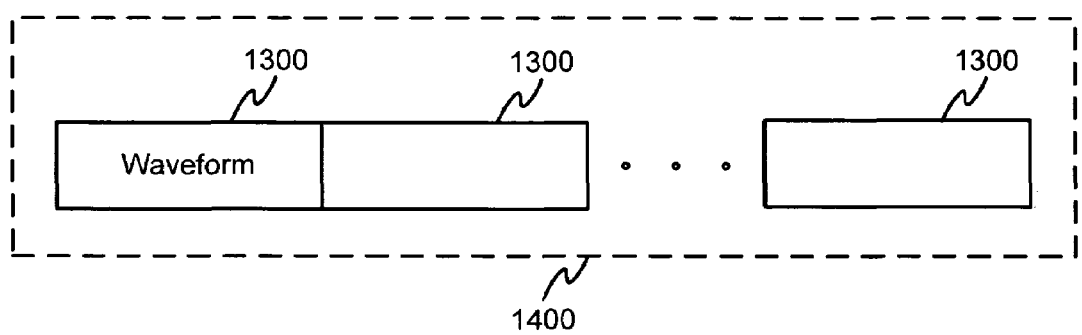
FIG. 14 is a diagram of an exemplary embodiment of a sequence for controlling a light in accordance with the present invention.

FIG. 14 is a diagram of an exemplary embodiment of a sequence for controlling a light in accordance with the present invention. In particular, a sequence 1400 is comprised of one or more waveforms 1300.

In operation, waveforms 1300 may be combined in series to form a sequence 1400. In addition, a single waveform 1300, or group of waveforms, may be repeated to form a sequence 1400.

Figure 15:
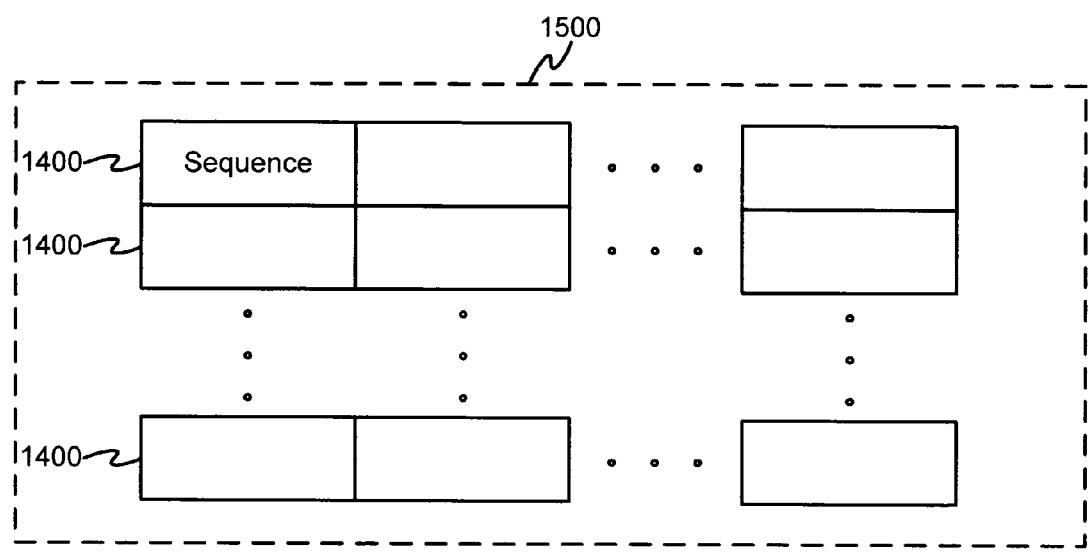
FIG. 15 is a diagram of an exemplary embodiment of a pattern for controlling a light in accordance with the present invention.

FIG. 15 is a diagram of an exemplary embodiment of a pattern for controlling lights in accordance with the present invention. In particular, a pattern 1500 is comprised of one or more sequences 1400.

In operation, a light controller controls light modules in accordance with the waveforms and/or sequences comprising a pattern. Pattern data represents the desired appearance, over time, of each light in the system that is being controlled. Referring to FIG. 15, each row is a sequence that may be used to control an individual light module, or a group of light modules, in accordance with a contemplated use of the invention. At each selected time interval, the light controller processor evaluates the pattern data and outputs a signal on an output port corresponding to each sequence and each waveform within the sequence that corresponds to the time interval being processed.

Figure 16:
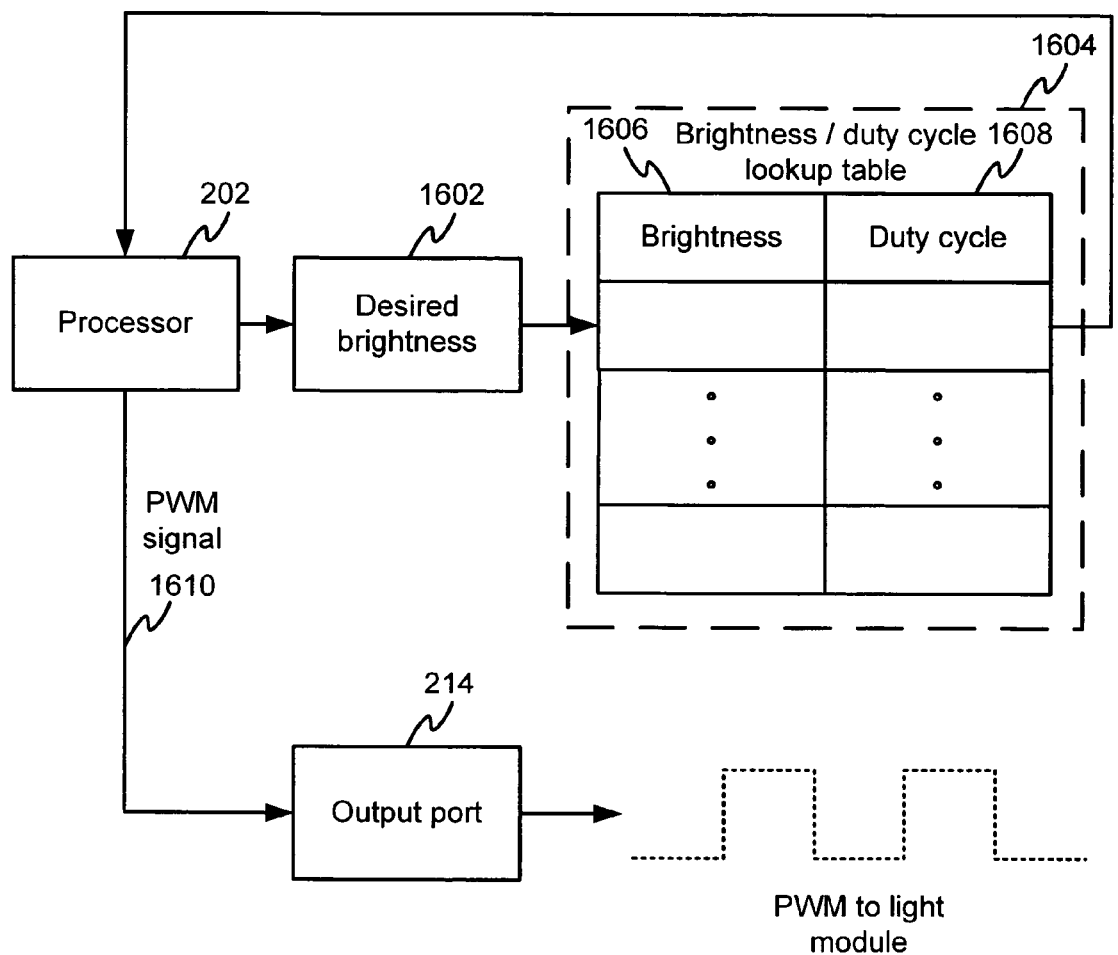
FIG. 16 is a block diagram of an exemplary embodiment of controlling the brightness of a light in accordance with the present invention.

FIG. 16 is a block diagram of an exemplary embodiment of controlling the brightness of a light in accordance with the present invention. In particular, a processor 202 is coupled to a storage module 1604 and an output port 214. The processor 202 provides a desired brightness value 1602 and a pulse width modulation signal 1610. The storage module 1604 stores a table comprising a brightness value 1606 and a duty cycle value 1608.

In operation, the processor obtains a desired brightness value 1602 and indexes into the brightness/duty cycle look up table 1604 to a brightness value 1606 close to the desired brightness value 1602. The duty cycle 1608 corresponding to the brightness value 1606 is sent to the processor 202. Based on the duty cycle 1608, the processor determines an appropriate pulse width modulation signal 1610 to transmit to the output port 214 for sending to the light module (not shown). It should be appreciated that the look up table is shown for purposes of illustration and the desired brightness to duty cycle nonlinear conversion may be accomplished in various ways, such as, for example, by equation, by hash table, by other data structures, by database, and/or the like.

Figure 17:
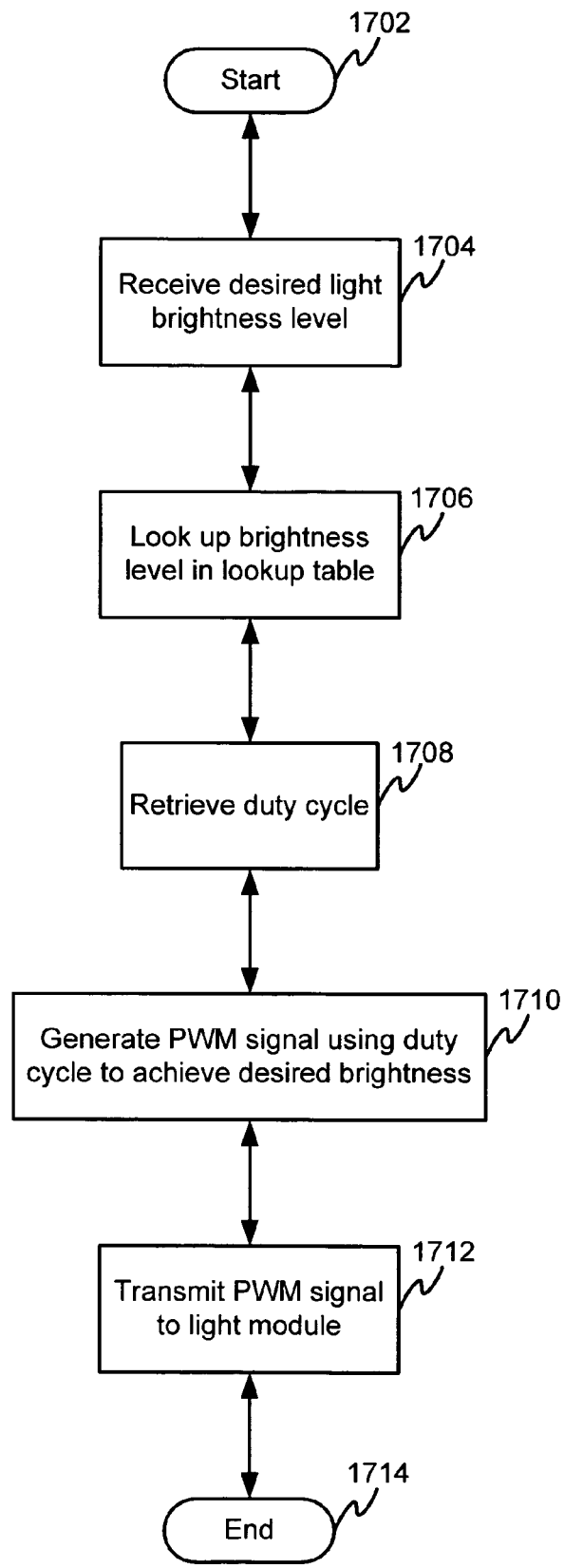
FIG. 17 is a flowchart of an exemplary embodiment of a method for controlling the brightness of a light in accordance with the present invention.

FIG. 17 is a flowchart of an exemplary embodiment of a method for controlling the brightness of a light in accordance with the present invention. In particular, control begins in step 1702 and continues to step 1704. In step 1704, a desired brightness level is received. Control then continues to step 1706.

In step 1706, the brightness level is looked up in the look up table. The closest brightness value to the desired brightness value in the look up table is selected. Control then continues to step 1708. In step 1708, the duty cycle corresponding to the brightness value identified in step 1706 above, is retrieved. Control then continues to step 1710.

In step 1710, a pulse width modulated (PWM) signal is generated in response to the duty cycle retrieved in order to cause the light to output a brightness level similar to the desired brightness level. In step 1712, the PWM signal is transmitted to the light module. Control then continues to step 1714, where the control sequence ends.

Figure 18:
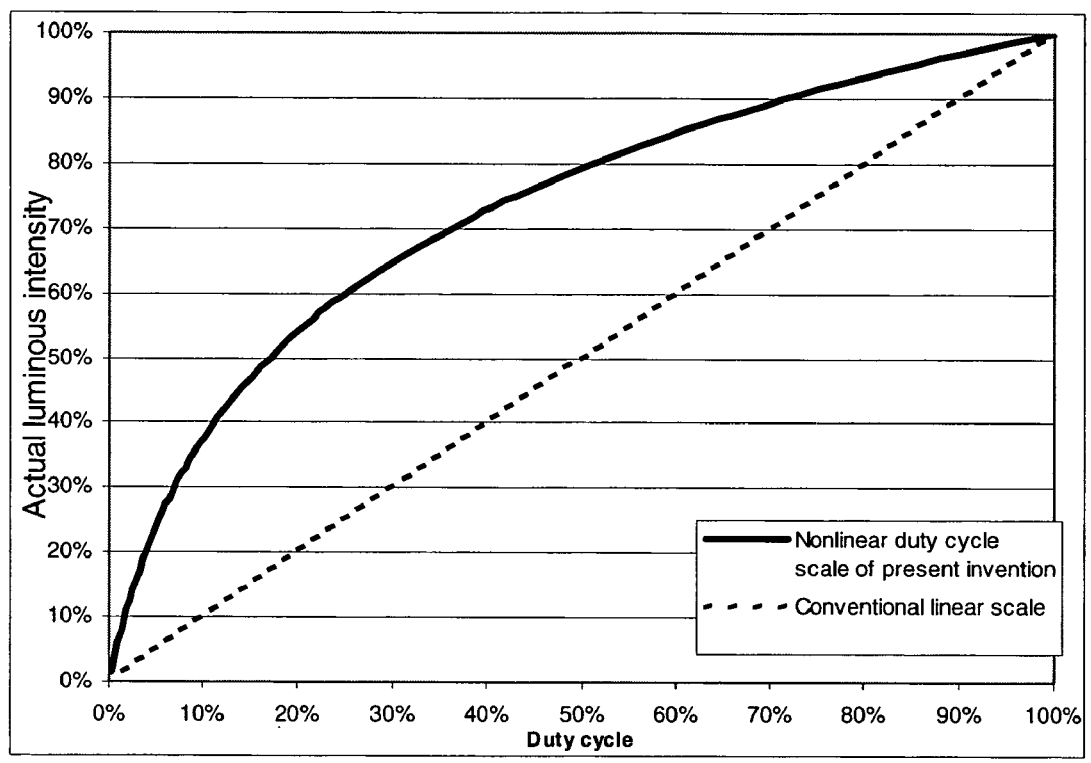
FIG. 18 is a graph showing the nonlinear brightness to duty cycle relationship in accordance with the present invention.

FIG. 18 is a graph showing the nonlinear brightness to duty cycle relationship in accordance with the present invention. In particular, the light controller of the present invention varies the duty cycle of the light emitting diode in order to achieve a more linear response in the perceived brightness. Conventional light controllers may vary the duty cycle of the light emitting diode according to a linear scale.

Figure 19:
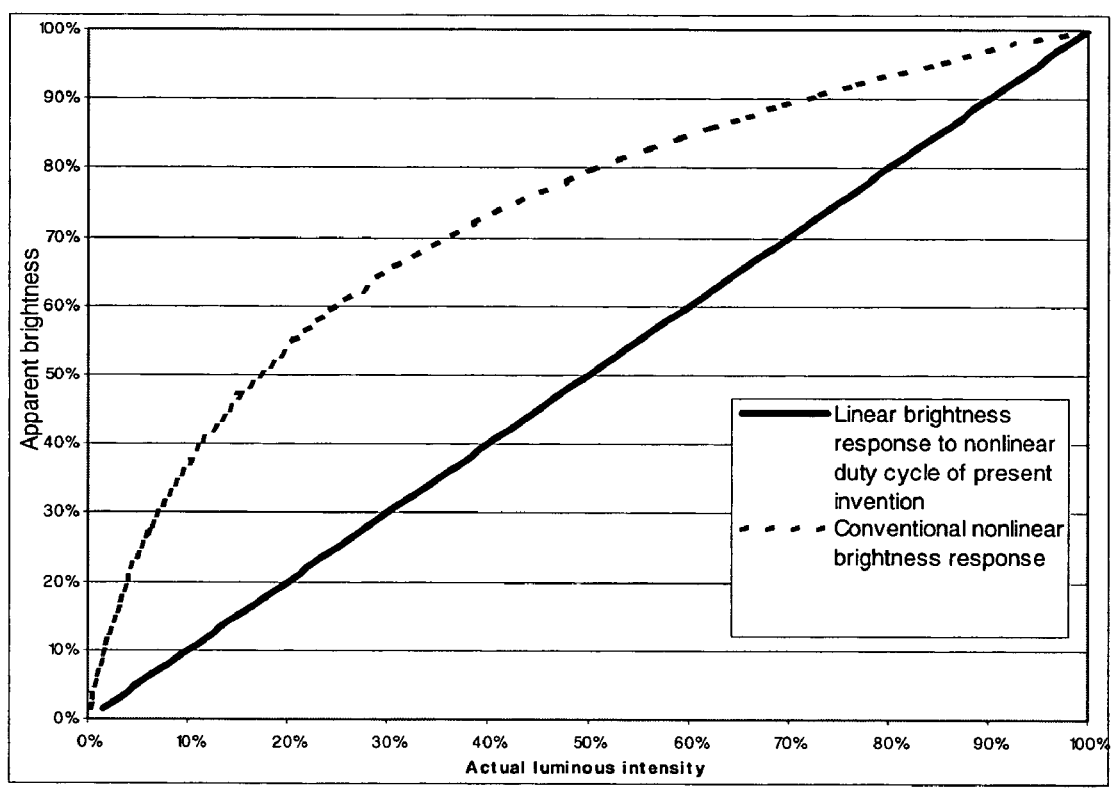
FIG. 19 is a graph showing the linear brightness response to the nonlinear duty cycle in accordance with the present invention.

FIG. 19 is a graph showing the linear brightness response to the nonlinear duty cycle in accordance with the present invention. In particular, FIG. 19 shows the brightness response of the light emitting diode when the duty cycle variations shown in FIG. 18 are applied. The response of a conventional light controller may be shown as the curved line, indicating the nonlinear response. In other words, a conventional light controller, when fading a light emitting diode on or off may cause a change in brightness that is not perceived by the eye to be smooth and even. A light controller in accordance with the present invention may generate a response from the light emitting diode that is uniform and linear, resulting in a visual perception that the brightness is changing in a linear fashion.

Figure 20:
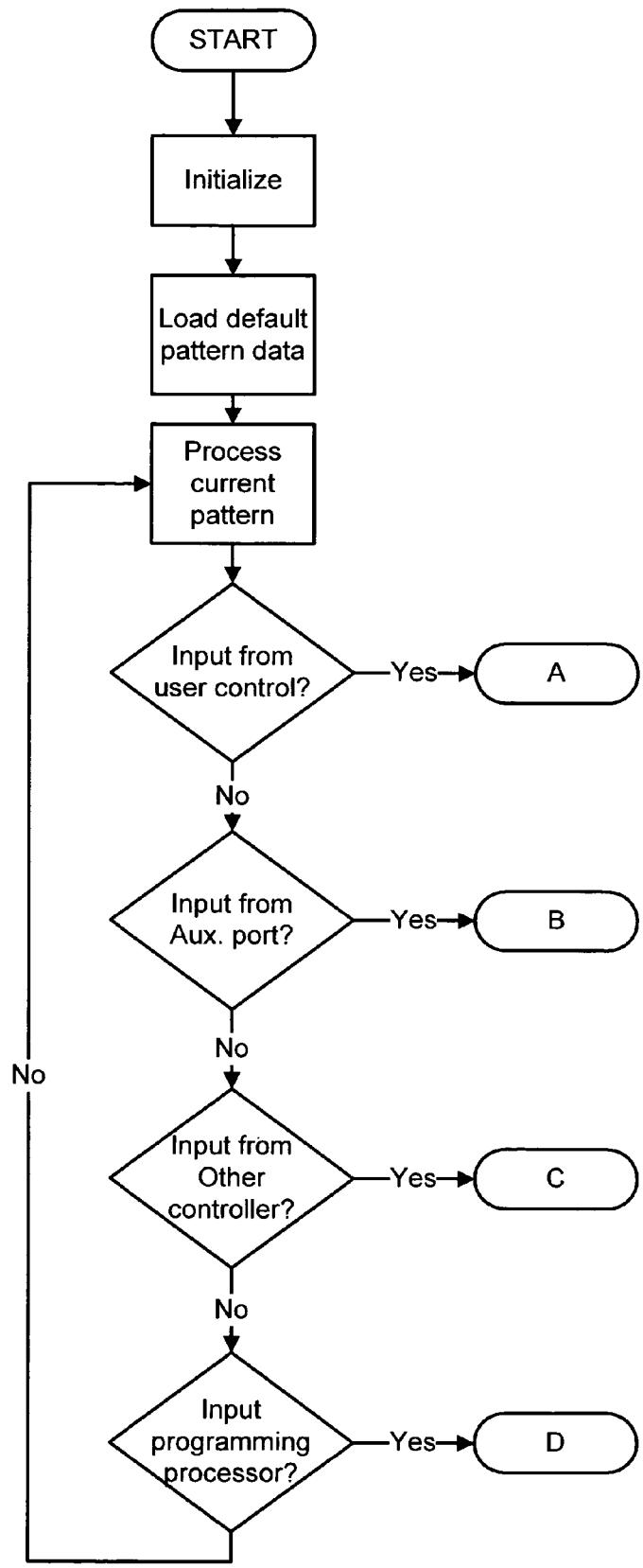
FIG. 20 is a flowchart showing an exemplary embodiment of a method for controlling a light in accordance with the present invention.

FIG. 20 is a flowchart showing an exemplary embodiment of a method for controlling a light in accordance with the present invention. In particular, control begins at step 2002 and continues to step 2004. In step 2004, the light controller is initialized. Control then continues to step 2006.

In step 2006, a default light control pattern is loaded. Control continues to step 2008. In step 2008, the current light control pattern is processed and displayed, either in response to start-up or in response to a user requested light control pattern. Control then continues to step 2010.

In step 2010, the software determines if an input from the user has been received. If so, control continues to step 2018, shown in FIG. 20A. If not, control continues to step 2012.

In step 2012, input from the auxiliary port is evaluated. If an input has been received, control continues to step 2030, shown in FIG. 20B. If not, control continues to step 2014.

In step 2014, input from another control unit is evaluated. If input from another control unit has been received, then control continues to step 2034, shown in FIG. 20C. If not, control continues to step 2016.

In step 2016, connection to a programming computer is evaluated. If a connection with a programming computer is detected, then control continues to step 2040, shown in FIG. 20D. If not, control continues to step 2008, where the control begins the sequence of steps from 2008 again.

Figure 20A:
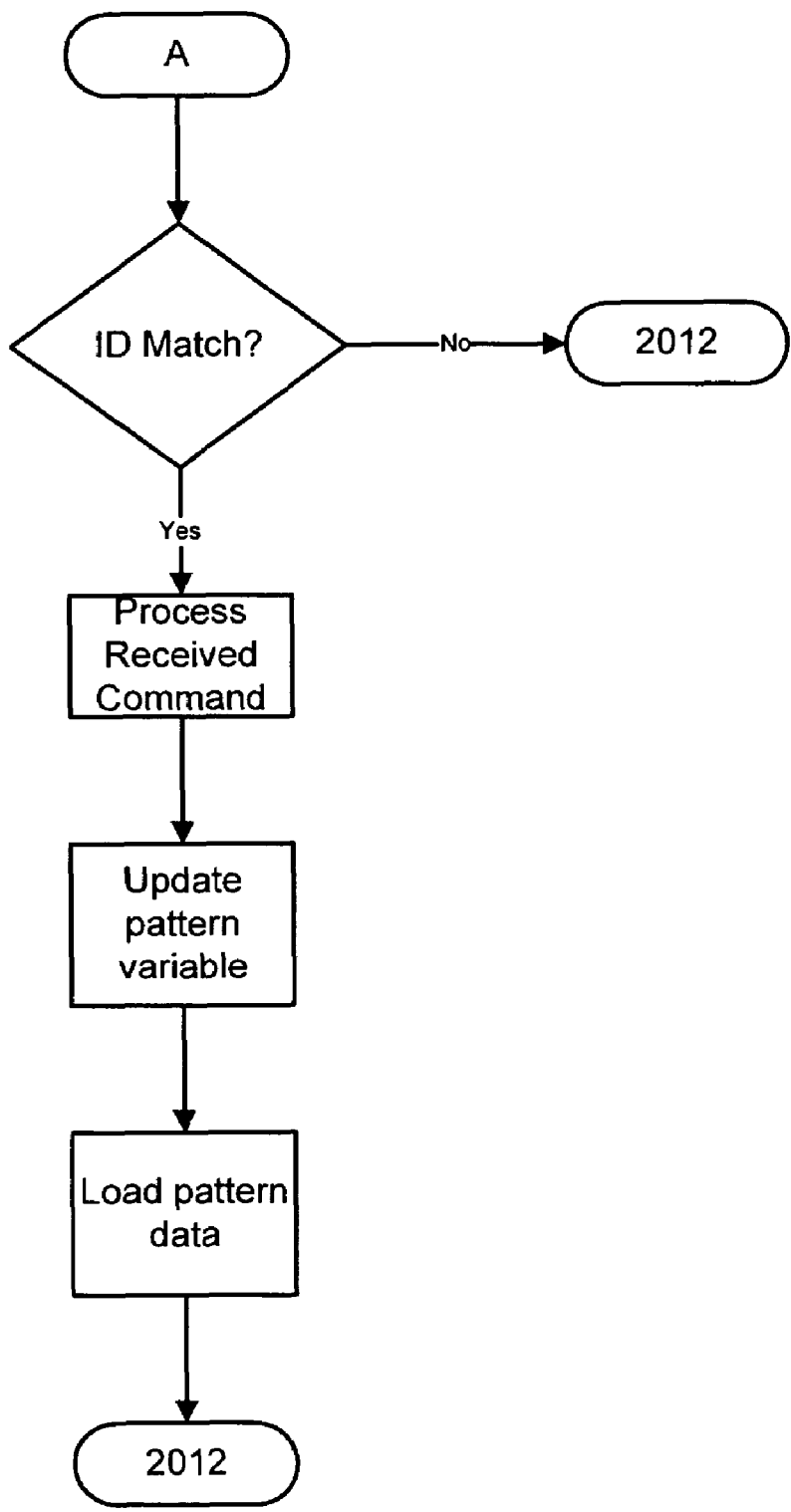

In step 2018, shown in FIG. 20A, the identification code received from a user control device is compared against the identification code stored in the light controller. If the two identification codes match, then control continues to step 2022, otherwise control continues to step 2020, where control returns to step 2012 on FIG. 20.

In step 2022, the command received is processed. Control then continues to step 2024. In step 2024, the pattern variable may be updated if required by the command. In other words, the user may have sent a command to change light display patterns. Control then continues to step 2026, where the newly selected pattern data is loaded into memory. Control continues to step 2028, where control returns to step 2008, in FIG. 20.

Figure 20B:
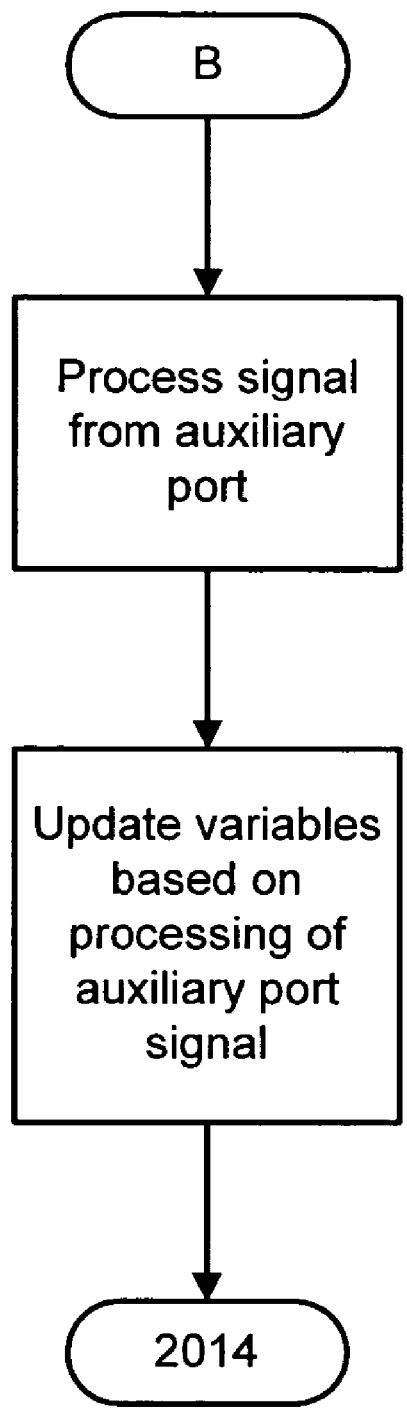

In step 2030, shown in FIG. 20B, the signal from the auxiliary port is processed. Control then continues to step 2032. In step 2032, variables may be updated corresponding to the processing of the audio signal. Control then returns to step 2014, in FIG. 20.

Figure 20C:
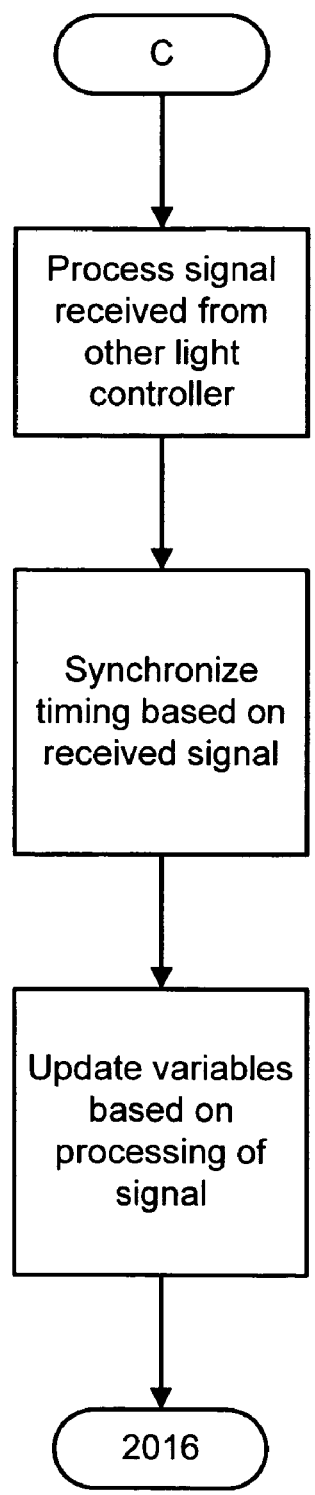

In step 2034, shown in FIG. 20C, the signal received from the other control unit is processed. Control then continues to step 2036. In step 2036, the timing between the two control units is synchronized. Control then continues to step 2038.

In step 2038, variables may be updated corresponding to the signal received from the other light controller. Control then continues to step 2016 in FIG. 20.

Figure 20D:
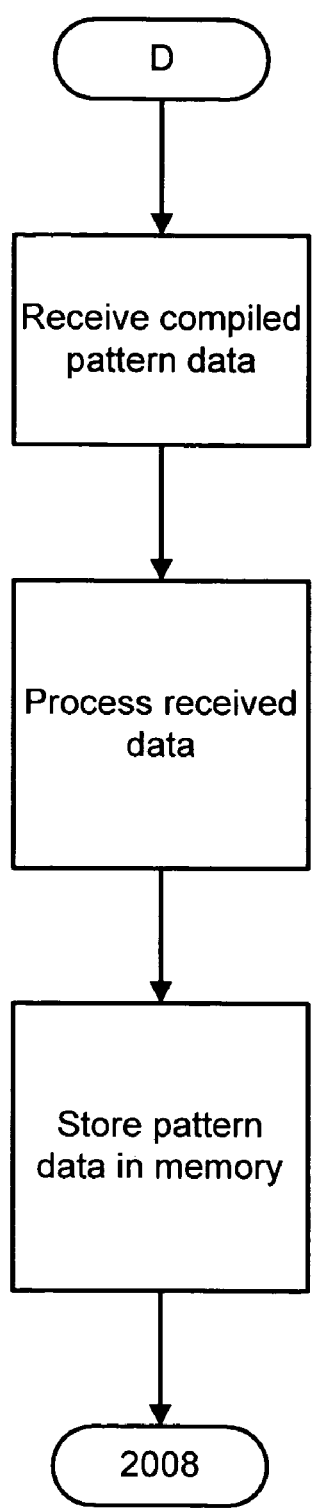

In step 2040, shown in FIG. 20D, compiled pattern data is received from the programming computer. Control continues to step 2042. In step 2042, the pattern data is processed. Control continues to step 2044.

In step 2044, the pattern data is stored in memory. Control then continues to step 2008 in FIG. 20.

The methods and systems for controlling lights, as shown in the above figures, may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic device such as a PLD, PLA, FPGA, PAL, or the like. In general, any process capable of implementing the functions described herein can be used to implement methods and systems for controlling lights according to this invention.

Furthermore, the disclosed system may be readily implemented in software using object or object-oriented software development environments that provide portable source code that can be used on a variety of computer platforms. Alternatively, the disclosed methods and systems for controlling lights may be implemented partially or fully in hardware using standard logic circuits or a VLSI design. Other hardware or software can be used to implement the systems in accordance with this invention depending on the speed and/or efficiency requirements of the systems, the particular function, and/or a particular software or hardware system, microprocessor, or microcomputer system being utilized. The methods and systems for controlling lights illustrated herein can readily be implemented in hardware and/or software using any known or later developed systems or structures, devices and/or software by those of ordinary skill in the applicable art from the functional description provided herein and with a general basic knowledge of the computer and electrical arts.

Moreover, the disclosed methods may be readily implemented in software executed on programmed general-purpose computer, a special purpose computer, a microprocessor, or the like. In these instances, the systems and methods of this invention can be implemented as program embedded on personal computer such as JAVA® or CGI script, as a resource residing on a server or graphics workstation, as a routine embedded in a dedicated encoding/decoding system, or the like. The system can also be implemented by physically incorporating the system and method into a software and/or hardware system, such as the hardware and software systems of a navigation processor, vehicle control processor, or image processor.

It is, therefore, apparent that there is provided in accordance with the present invention, a light controller and methods for controlling lights. While this invention has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and scope of this invention.

What is claimed is:

1. A light controller comprising:
a brightness control module controlling a brightness of a light for every one of a predetermined number of clock cycles, wherein the brightness of the light is determined based on a non-linear relationship between a duty cycle and a desired brightness, the desired brightness being based on a waveform of at least one light sequence.

2. The light controller of claim 1, further comprising a storage module coupled to the brightness control module, said storage module providing the duty cycle corresponding to the desired brightness to the brightness control module.

3. The light controller of claim 2, further comprising an auxiliary input module.

4. The light controller of claim 3, further comprising a user control input module.

5. The light controller of claim 4, further comprising a signal-receiving module.

6. The light controller of claim 5, further comprising a bi-directional data transfer module.

7. The light controller of claim 6, wherein the storage module stores the at least one light sequence.

8. The light controller of claim 7, wherein the at least one light sequence is stored in a read only memory.

9. The light controller of claim 7, wherein the at least one light sequence is transferred to the light controller through the bi-directional data transfer module.

10. The light controller of claim 1, wherein the light is any one or more of a headlight, a tail light, a dome light, a hood light, a trunk light, an instrument light, a dashboard light, an instrument panel light, a control knob light, a door light, an exterior accent light, an interior accent light, a turn signal, a cabin light, a license plate light, a reverse light, a hazard light, an air vent light, a warning light, and an audio system light.

11. A method for controlling a light, comprising:
receiving a clock signal;
receiving a desired brightness of the light associated with a predetermined number of clock signal cycles, the desired brightness being based on a section of a waveform that represents more than one duty cycle interval;
determining a duty cycle based on the desired brightness;
determining a modulation waveform based on the duty cycle; and
transmitting the modulation waveform to the light for the predetermined number of clock signal cycles.

12. The method of claim 11, wherein the step of determining a duty cycle based on the desired brightness, further comprises accessing a storage based on the desired brightness and retrieving a duty cycle corresponding to the desired brightness.

13. The method of claim 11, further comprising the step of receiving the predetermined number of clock cycles from a light control sequence.

14. The method of claim 11, further comprising the step of altering the desired brightness based on an external signal.

15. The method of claim 14, wherein the external signal is an audio signal.

16. The method of claim 14, wherein the external signal is a tachometer signal.

17. A light controller comprising:
a brightness control module controlling a brightness of a light for every one of a predetermined number of clock cycles, wherein the brightness of the light is determined based on a non-linear relationship between a duty cycle and a desired brightness, the desired brightness being based on a waveform of at least one light sequence; and a storage module.

18. The light controller of claim 17, wherein the predetermined number of clock cycles is stored in the storage module.

19. The light controller of claim 18, wherein the predetermined number of clock cycles are a section of a waveform, and wherein the waveform comprises an initial delay section, a rise section, a hold section, a decay section, and an ending delay section.

20. The light controller of claim 19, wherein one or more waveforms are coupled to form a sequence associated with at least one light.

21. The light controller of claim 20, wherein one or more sequences are joined to form a pattern associated with one or more lights.

22. A method for controlling a light comprising:

receiving a clock signal;

receiving a desired brightness of the light associated with a predetermined number of clock signal cycles;

determining a duty cycle based on the desired brightness;

determining a modulation waveform based on the duty cycle; and transmitting the modulation waveform to the light for the predetermined number of clock signal cycles, wherein the predetermined number of clock cycles corresponds to a section of a waveform that represents more than one duty cycle interval.

23. The method of claim 22, wherein the waveform comprises an initial delay section, a rise section, a hold section, a decay section, and an ending delay section.

24. The method of claim 23, wherein one or more waveforms are coupled to form a sequence associated with at least one light.

25. The method of claim 24, wherein one or more sequences are joined to form a pattern associated with one or more lights.

26. A light controller comprising:

means for receiving a clock signal;

means for receiving a desired brightness of the light associated with a predetermined number of clock signal cycles;

means for determining a duty cycle based on the desired brightness;

means for determining a modulation waveform based on the duty cycle; and means for transmitting the modulation waveform to the light for the predetermined number of clock signal cycles, wherein the predetermined number of clock cycles corresponds to a section of a waveform that represents more than one duty cycle interval.

* * * * *